(12) United States Patent
Takagaki

(10) Patent No.: US 10,419,713 B2
(45) Date of Patent: Sep. 17, 2019

(54) REPRODUCTION DEVICE AND OUTPUT DEVICE

(71) Applicant: Panasonic Intellectual Property Management Co., Ltd., Osaka (JP)

(72) Inventor: Keiichi Takagaki, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 15/548,026

(22) PCT Filed: Jan. 25, 2016

(86) PCT No.: PCT/JP2016/000330
§ 371 (c)(1),
(2) Date: Aug. 1, 2017

(87) PCT Pub. No.: WO2016/129216
PCT Pub. Date: Aug. 18, 2016

(65) Prior Publication Data
US 2018/0020182 A1   Jan. 18, 2018

(30) Foreign Application Priority Data

Feb. 13, 2015   (JP) ................................. 2015-026991

(51) Int. Cl.
*H04N 5/63*     (2006.01)
*H04N 21/443*   (2011.01)
(Continued)

(52) U.S. Cl.
CPC ................. *H04N 5/63* (2013.01); *G06F 1/26* (2013.01); *G06F 1/266* (2013.01); *G06F 3/16* (2013.01);
(Continued)

(58) Field of Classification Search
None
See application file for complete search history.

(56) References Cited

U.S. PATENT DOCUMENTS

2002/0147994 A1* 10/2002 Kessler ................ H04N 5/4401
725/151
2006/0245720 A1* 11/2006 Obara ................ H04N 21/4143
386/232
(Continued)

FOREIGN PATENT DOCUMENTS

EP    2387205 A1    11/2011
JP    2008-219358   9/2008
(Continued)

OTHER PUBLICATIONS

International Search Report of PCT application No. PCT/JP2016/000330 dated Apr. 5, 2016.
(Continued)

*Primary Examiner* — Ricky Chin
(74) *Attorney, Agent, or Firm* — McDermott Will & Emery LLP

(57) ABSTRACT

A reproducing device includes a reproducer that reproduces a content, a communicator that establishes a direct wireless connection to an information terminal, and a controller. The controller determines whether the information terminal is a previously permitted information terminal or not when the communicator receives a content reproduction request from the information terminal through wireless connection. The controller performs first control to power on the reproducer, and issues an instruction to perform the content reproduction to the reproducer, when it is determined that the information terminal is the previously permitted information terminal, and when the reproducer is powered off. The controller does not perform the first control when it is determined that the
(Continued)

information terminal is not the previously permitted information terminal.

9 Claims, 18 Drawing Sheets

(51) Int. Cl.
| | |
|---|---|
| *H04N 21/4363* | (2011.01) |
| *H04N 21/418* | (2011.01) |
| *G06F 3/16* | (2006.01) |
| *G06F 13/00* | (2006.01) |
| *G06F 1/26* | (2006.01) |
| *H04B 1/16* | (2006.01) |
| *H04B 1/40* | (2015.01) |
| *H04M 1/00* | (2006.01) |
| *H04Q 9/00* | (2006.01) |
| *H04W 92/08* | (2009.01) |
| *H04W 76/14* | (2018.01) |
| *H04L 29/08* | (2006.01) |

(52) U.S. Cl.
CPC ............... *G06F 13/00* (2013.01); *H04B 1/16* (2013.01); *H04B 1/40* (2013.01); *H04M 1/00* (2013.01); *H04N 21/4181* (2013.01); *H04N 21/43637* (2013.01); *H04N 21/443* (2013.01); *H04N 21/4431* (2013.01); *H04N 21/4432* (2013.01); *H04N 21/4433* (2013.01); *H04N 21/4436* (2013.01); *H04Q 9/00* (2013.01); *H04W 92/08* (2013.01); *H04L 67/125* (2013.01); *H04W 76/14* (2018.02)

(56) References Cited

U.S. PATENT DOCUMENTS

| | | | | |
|---|---|---|---|---|
| 2009/0128447 | A1* | 5/2009 | Yoshikawa | G06F 3/1431 345/1.1 |
| 2009/0207307 | A1* | 8/2009 | Tsuru | G09G 5/006 348/554 |
| 2010/0083014 | A1* | 4/2010 | Araki | H04N 5/7755 713/310 |
| 2010/0302465 | A1* | 12/2010 | Shoji | H04N 5/4403 348/744 |
| 2011/0055538 | A1* | 3/2011 | Cho | G06F 9/4418 713/2 |
| 2011/0285917 | A1* | 11/2011 | Murase | H04N 21/43615 348/723 |
| 2014/0320886 | A1* | 10/2014 | Uchikawa | H04N 1/4433 358/1.14 |
| 2015/0302732 | A1* | 10/2015 | Wright | G08C 17/02 340/5.25 |
| 2016/0191723 | A1* | 6/2016 | Yue | H04N 1/00209 358/1.15 |
| 2017/0272398 | A1* | 9/2017 | Cho | H04L 61/103 |
| 2017/0366975 | A1* | 12/2017 | Kamimura | G06F 3/147 |

FOREIGN PATENT DOCUMENTS

| | | |
|---|---|---|
| JP | 2010-087831 | 4/2010 |
| JP | 2010-093726 | 4/2010 |
| JP | 2010-219705 | 9/2010 |
| JP | 2011-055142 | 3/2011 |
| JP | 2014-064308 | 4/2014 |

OTHER PUBLICATIONS

The Extended European Search Report dated Jan. 16, 2018 for the related European Patent Application No. 16748864.2.

Communication pursuant to Article 94(3) EPC dated Feb. 14, 2019 for the related European Patent Application No. 16748864.2.

* cited by examiner

Power on display

Display authentication screen

REPRODUCTION DEVICE AND OUTPUT DEVICE

CROSS-REFERENCE TO RELATED APPLICATIONS

This application is a U.S. national stage application of the PCT International Application No. PCT/JP2016/000330 filed on Jan. 25, 2016, which claims the benefit of foreign priority of Japanese patent application No. 2015-026991 filed on Feb. 13, 2015, the contents all of which are incorporated herein by reference.

TECHNICAL FIELD

The present disclosure relates to a reproducing device and an output device for receiving an instruction from another device through a network.

BACKGROUND ART

PTL 1 discloses a wireless communication system that establishes a direct wireless connection between a plurality of wireless devices which are wirelessly connectable. According to the technique disclosed in PTL 1, the wireless connection can easily be established between the wireless devices.

However, for example, when the plurality of wireless devices include an information terminal and a reproducing device, it has been conventionally necessary for a user to previously establish the direct wireless connection between the information terminal and the reproducing device to power on the information terminal and the reproducing device, in order that the information terminal wirelessly transmits a reproduction request to the reproducing device by radio to cause the reproducing device to perform reproduction operation.

CITATION LIST

Patent Literature

PTL 1: Unexamined Japanese Patent Publication No. 2008-219358

SUMMARY OF THE INVENTION

The present disclosure provides a reproducing device and an output device which can simplify user operation on an information terminal.

The reproducing device of the present disclosure includes a reproducer that reproduces a content, a communicator that establishes a direct wireless connection to an information terminal, and a controller. The controller determines whether the information terminal is a previously permitted information terminal or not when the communicator receives a content reproduction request from the information terminal through wireless connection. The controller performs first control to power on the reproducer and issues an instruction to perform the content reproduction to the reproducer, when the information terminal is determined to be the previously permitted information terminal and when the reproducer is powered off. The controller does not perform the first control when the information terminal is determined not to be the previously permitted information terminal.

The output device of the present disclosure includes an output unit that outputs at least one of video and sound, a communicator that establishes a direct wireless connection to an information terminal, and a controller. The controller performs first control to power on the output unit, and issues an instruction to output at least one of the video and sound, which are generated by an application started up in response to an application start-up request, to the output unit, when the communicator receives the application start-up request from the information terminal through wireless connection and when the output unit is powered off. The controller performs second control to power off the output unit when the application started up in response to the application start-up request is ended after the first control is performed.

The reproducing device and the output device of the present disclosure can simplify the operation of the user who operates the reproducing device or output device using the information terminal.

DESCRIPTION OF EMBODIMENTS

Hereinafter, exemplary embodiments will be described in detail with reference to the drawings. However, unnecessary detailed description may occasionally be omitted. For example, the detailed description of well-known matters and redundant description of substantially the same configurations may occasionally be omitted. This is to avoid the following description from becoming unnecessarily redundant, and to ease understanding of those skilled in the art.

The accompanying drawings and the following description are provided to allow those skilled in the art to fully understand the present disclosure, and is not intended to limit the subject matter defined in the claims Each figure is a schematic view, and not always exactly illustrated. In the figures, the substantially identical constituents are designated by the same reference mark, and the overlapping description may be omitted or simplified.

First Exemplary Embodiment

A first exemplary embodiment will be described below with reference to FIGS. 1 to 10.

[1-1. Configuration]

Figure 1:
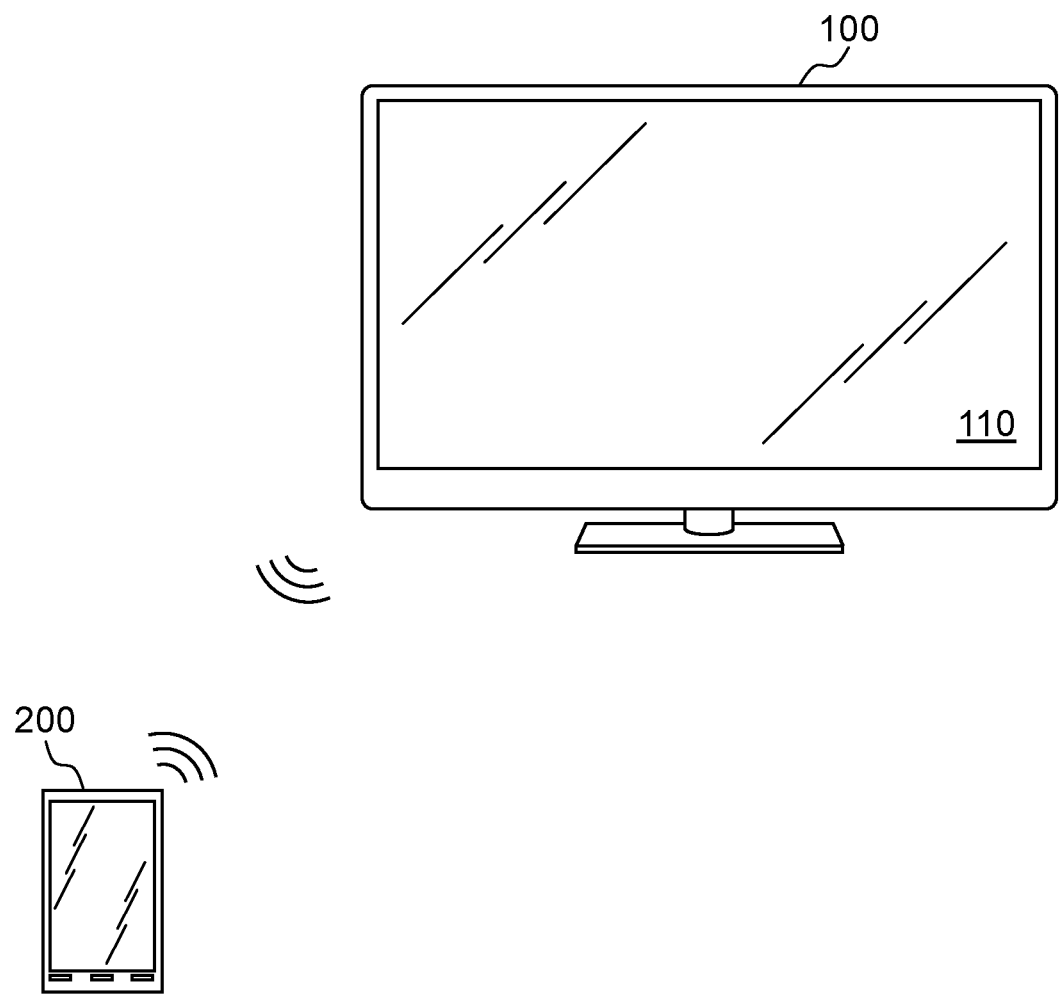
FIG. 1 is a view schematically illustrating appearance examples of a reproducing device and an information terminal according to a first exemplary embodiment.

FIG. 1 is a view schematically illustrating appearance examples of reproducing device 100 and information terminal 200 according to the first exemplary embodiment.

As illustrated in FIG. 1, a communication connection is established by direct communication between reproducing device 100 and information terminal 200, and information is transmitted and received by direct communication. For example, reproducing device 100 receives control information from information terminal 200 in order to control operation of reproducing device 100.

Figure 2:
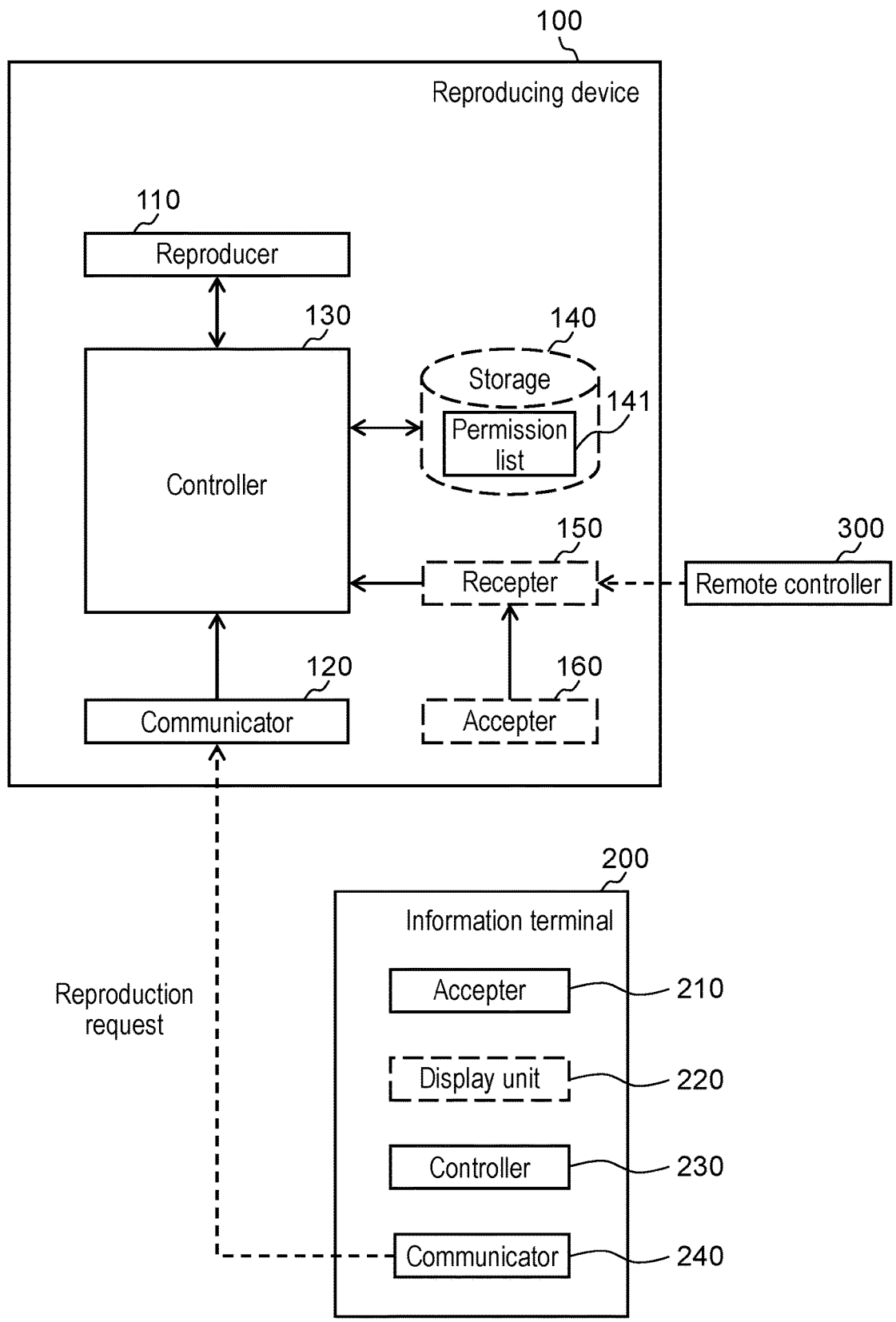
FIG. 2 is a block diagram schematically illustrating configuration examples of the reproducing device and the information terminal according to the first exemplary embodiment.

FIG. 2 is a block diagram schematically illustrating configuration examples of reproducing device 100 and information terminal 200 according to the first exemplary embodiment.

As illustrated in FIG. 2, reproducing device 100 includes reproducer 110, communicator 120, and controller 130. Reproducing device 100 may also include storage 140, recepter 150, and accepter 160.

Reproducing device 100 is a device that can reproduce contents such as a moving image, a still image, and music. In the present exemplary embodiment, reproducing device 100 is a television set (hereinafter, abbreviated to "TV"). Alternatively, reproducing device 100 may be a recorder, a set-top box, and the like.

Reproducer 110 reproduces the content, and outputs a reproduced result. Content data indicating the content reproduced with reproducer 110 may be obtained from information terminal 200, storage 140, or a server connected to reproducing device 100 through a network. That is, reproducer 110 may receive the content data (such as video data and audio data) from information terminal 200, and reproduce the content indicated by the content data. Reproducer 110 may receive a content identifier for identifying the content data from information terminal 200, obtain the content data identified by the content identifier from storage 140 or the server, and reproduce the content indicated by the obtained content data.

Reproducer 110 has a video reproduction function of reproducing video data such as a moving image and a still image to output a video signal and an audio reproduction function of reproducing audio data such as music to output an audio signal. Alternatively, reproducer 110 may have only one of the video reproduction function and the audio reproduction function. For example, reproducer 110 is implemented by a processor, a memory in which a program is stored, and the like.

Not only reproducer 110 outputs the video signal generated by the reproduction of the video data, but also reproducer 110 may include a monitor that outputs (displays) video obtained from the video signal. Similarly, not only reproducer 110 outputs the audio signal generated by the reproduction of the audio data, but also reproducer 110 may include a loudspeaker that outputs sound obtained from the audio signal. That is, for example, reproducer 110 may include not only the processor and the memory, but also a display that outputs the video or the loudspeaker (including an amplifier) that outputs the sound.

Communicator 120 establishes the direct wireless connection to information terminal 200. Specifically, communicator 120 establishes the direct wireless connection to information terminal 200 by Wi-Fi Direct (®). For example, communicator 120 is implemented by a processor, a memory in which a program is stored, a communication module that can conduct communication by Wi-Fi (®), and the like.

Controller 130 is a processing unit that controls reproducer 110 according to control information (control information controlling operation of reproducing device 100) obtained by communicator 120 or user-operation control information received by recepter 150 (to be described later). For example, controller 130 is implemented by a processor, a memory in which a program is stored, and the like.

Controller 130 determines whether information terminal 200 is a previously permitted information terminal.

Specifically, controller 130 determines whether communicator 120 has received a content reproduction request from information terminal 200 by Wi-Fi Direct (®). When the content reproduction request is received, controller 130 determines whether information terminal 200 is the previously permitted information terminal by referring to permission list 141 (to be described later) stored in storage 140. At this point, controller 130 obtains terminal information indicating information terminal 200 from information terminal 200 to determine whether the obtained terminal information is included in permission list 141. When the obtained terminal information is included in permission list 141, controller 130 determines that information terminal 200 is the previously permitted information terminal. When the obtained terminal information is not included in permission list 141, controller 130 determines that information terminal 200 is not the previously permitted information terminal.

Controller 130 determines whether information terminal 200 is the previously permitted information terminal by referring to permission list 141 stored in storage 140. However, the present disclosure is not limited to this operation. For example, controller 130 may provide key information to information terminal 200 when permitting communication with information terminal 200. When information terminal 200 transmits the key information in establishing the next communication connection, controller 130 may determine that information terminal 200 that has transmitted the key information is the previously permitted information terminal. The key information need not be provided from the reproducing device, but for example, the key information may be information such as a PIN (Personal Identification Number) code, which is input by a user. That is, controller 130 may determine that information terminal 200 is the previously permitted information terminal when the PIN code received from information terminal 200 is a predetermined PIN code.

When it is determined that that information terminal 200 is the previously permitted information terminal, and when reproducer 110 is powered off, controller 130 performs the first control to power on reproducer 110, and issues an instruction to reproduce the content to reproducer 110. When it is determined that information terminal 200 is not the previously permitted information terminal, controller 130 does not perform the first control. Specifically, when it is determined that information terminal 200 is the previously permitted information terminal, controller 130 determines whether reproducer 110 is powered off. When it is determined that reproducer 110 is powered off, controller 130 powers on reproducer 110 to issue an instruction to reproduce the content to reproducer 110. On the other hand, when it is determined that information terminal 200 is not the previously permitted information terminal, controller 130 does not perform any control.

At this point, for example, the state in which reproducer 110 is powered on may be a state in which the power is supplied to the processor that reproduces the video, or a state in which the power is supplied to the display. For example, the state in which reproducer 110 is powered on may be a state in which the power is supplied to the processor that reproduces the sound, or a state in which the power is supplied to the loudspeaker (including an amplifier).

When the content reproduction started in response to the content reproduction request is ended after the first control is performed, controller 130 may perform second control to power off reproducer 110.

Controller 130 may not perform the second control when the user operation on reproducing device 100 is received until the content reproduction started in response to the content reproduction request is ended after the first control is performed. For example, as used herein, the user operation on reproducing device 100 refers to user operation performed through accepter 160 (to be described later), user operation performed using remote controller 300 (to be described later), and the like. Recepter 150 (to be described later) receives the user operation on reproducing device 100. That is, the user operation on reproducing device 100 does not include user operation performed on reproducing device 100 with information terminal 200. Note that the user operation refers to control in which the user performs input operation on accepter 160 or remote controller 300 to control operation of reproducing device 100.

Storage 140 stores permission list 141. For example, storage 140 is implemented by a nonvolatile semiconductor memory or an HDD (Hard Disk Drive).

Figure 3:
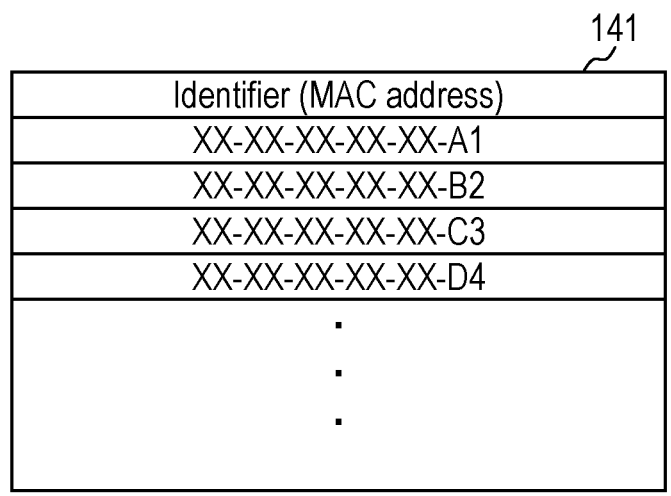
FIG. 3 is a view schematically illustrating an example of a permission list according to the first exemplary embodiment.

FIG. 3 is a view schematically illustrating an example of permission list 141 according to the first exemplary embodiment.

As illustrated in FIG. 3, permission list 141 is a list in which terminal information about information terminal 200 (hereinafter, referred to as a "permitted terminal") in which the user has permitted the communication connection to communicator 120 by direct communication in the past is recorded, that is, a list for identifying the permitted terminal. For example, an MAC (Media Access Control) address is recorded as the terminal information about the permitted terminal in permission list 141. The terminal information is not limited to the MAC address. Another piece of identification information may be used as the terminal information.

Hereinafter, information terminal in which the communication connection to communicator 120 by direct communication is not permitted by the user in the past and the terminal information is not recorded in permission list 141 is referred to as a "non-permitted terminal".

Recepter 150 receives an input signal, which is output from accepter 160 or remote controller 300 based on the user operation, and outputs control information specified by the received input signal to controller 130. For example, recepter 150 is implemented by a processor, a memory in which a program is stored, and the like. For example, recepter 150 may be implemented by not only the processor and the memory, but also a light receiving module that can receive an infrared signal from remote controller 300.

Accepter 160 is an input device, such as a button by which the input operation is performed by the user. When the user presses the button, accepter 160 outputs the input signal indicating that the button is pressed to recepter 150.

Remote controller 300 is an input device including an accepter (not illustrated), such as a button by which the input operation is performed by the user. When the user presses the button, remote controller 300 outputs the input signal indicating that the button is pressed to recepter 150. For example, remote controller 300 converts the input signal into infrared light to transmit the infrared light to recepter 150. Remote controller 300 may include not only the button but also a touch pad or a microphone for sound recognition as the accepter.

Information terminal 200 includes accepter 210, display unit 220, controller 230, and communicator 240. In the present exemplary embodiment, information terminal 200 is a smartphone. Information terminal 200 may be a tablet terminal, a PC (Personal Computer), and the like. Information terminal 200 may not include display unit 220.

Accepter 210 is an input device by which the input operation is performed by the user. When the user performs the input operation, accepter 210 generates the input signal indicating the input operation. For example, accepter 210 is implemented by a touch panel, a button, and a microphone. When the user performs touch input on the touch panel, when the user performs the input operation such as a gesture input, when the user presses the button, or when the user produces the sound for the purpose of the user operation, accepter 210 generates the input signal indicating the input operation. The user operation is a general term for these input operations.

Display unit 220 displays the video output from controller 230. For example, display unit 220 is implemented by a liquid crystal display or an organic EL display.

Controller 230 is a processing unit, which executes an application and outputs execution result to display unit 220. For example, controller 230 is implemented by a processor, a memory in which a program is stored, and the like.

Communicator 240 can establish the communication connection to communicator 120 of reproducing device 100 by direct communication. Specifically, communicator 240 can establish the communication connection to reproducing device 100 by Wi-Fi Direct (®). For example, communicator 240 is implemented by a processor, a memory in which a program is stored, a communication module that can conduct communication by Wi-Fi (®), and the like.

[1-2. Operation]

Operation of reproducing device 100 having the above configuration will be described below.

When receiving the content reproduction request from information terminal 200, reproducing device 100 performs processing of start of reproducing the content corresponding to the content reproduction request (hereinafter, referred to as "reproduction starting processing"). Details of the reproduction starting processing performed by reproducing device 100 will be described below with reference to FIG. 4. In the present exemplary embodiment, the content reproduction request may be simply referred to as a "reproduction request".

Figure 4:
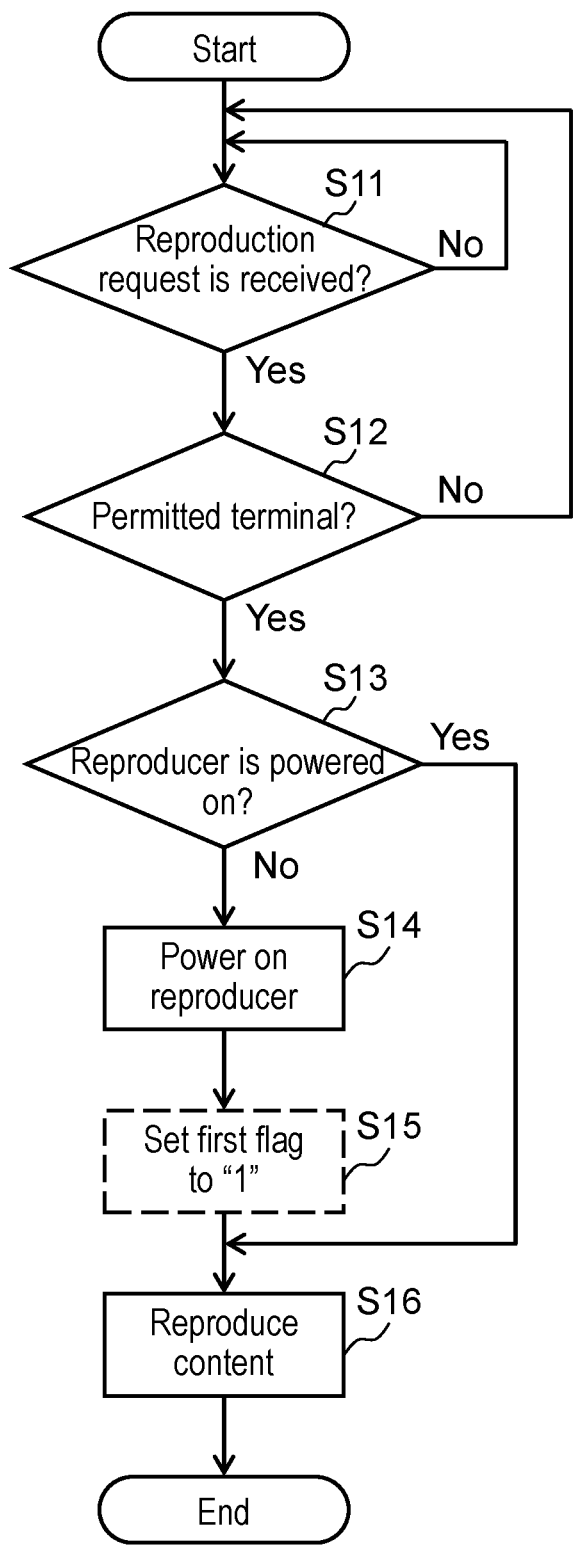
FIG. 4 is a flowchart illustrating an operation example of content reproduction starting processing performed by the reproducing device according to the first exemplary embodiment.

FIG. 4 is a flowchart illustrating an operation example of the content reproduction starting processing performed by reproducing device 100 according to the first exemplary embodiment.

First, controller 130 determines whether communicator 120 has received the content reproduction request from information terminal 200 (step S11).

Specifically, controller 130 determines whether communicator 120 has received the content reproduction request from information terminal 200 to which the communication connection is established by Wi-Fi Direct (registered trademark). The content reproduction request may include information designating a specific content. In the present exemplary embodiment, the case where a video reproduction request is received as the content reproduction request will be described by way of example. However, the content reproduction request is not limited to the video reproduction request, but may be an audio reproduction request.

Then, when it is determined in step S11 that communicator 120 has received the content reproduction request from information terminal 200 (Yes in step S11), controller 130 determines whether information terminal 200 that has transmitted the content reproduction request is the previously permitted information terminal (step S12).

On the other hand, when it is determined in step S11 that communicator 120 has not received the content reproduction request from information terminal 200 (No in step S11), controller 130 repeats the determination in step S11. That is, controller 130 waits until communicator 120 receives the content reproduction request from information terminal 200.

When it is determined in step S12 that information terminal 200 that has transmitted the content reproduction request is the previously permitted information terminal (Yes in step S12), controller 130 determines whether reproducer 110 is powered on (step S13).

On the other hand, when it is determined in step S12 that information terminal 200 that has transmitted the content reproduction request is not the previously permitted information terminal (No in step S12), controller 130 returns to the determination in step S11.

When it is determined in step S13 that reproducer 110 is powered on (Yes in step S13), controller 130 goes to processing in step S16.

When it is determined in step S13 that reproducer 110 is not powered on (No in step S13), controller 130 performs the first control to power on reproducer 110 (step S14).

Controller 130 changes a value of a first flag from "0" to "1" (step S15).

The first flag indicates that reproducer 110 is powered on (the first control is performed) by the content reproduction request transmitted from the permitted terminal, and the first flag becomes "1" when reproducer 110 changes from the power-off state to the power-on state by the content reproduction request transmitted from the permitted terminal. Accordingly, the first flag is "0" when reproducer 110 is powered off. The first flag is also "0" when reproducer 110 is already powered on before communicator 120 receives the content reproduction request from the permitted terminal. Accordingly, the first flag is "0" when the determination of Yes is made in step S13. For example, the first flag is stored in storage 140.

Then, controller 130 issues an instruction to reproduce the content corresponding to the reproduction request to reproducer 110 (step S16). Upon reception of the instruction, reproducer 110 starts the content reproduction.

Figure 5:
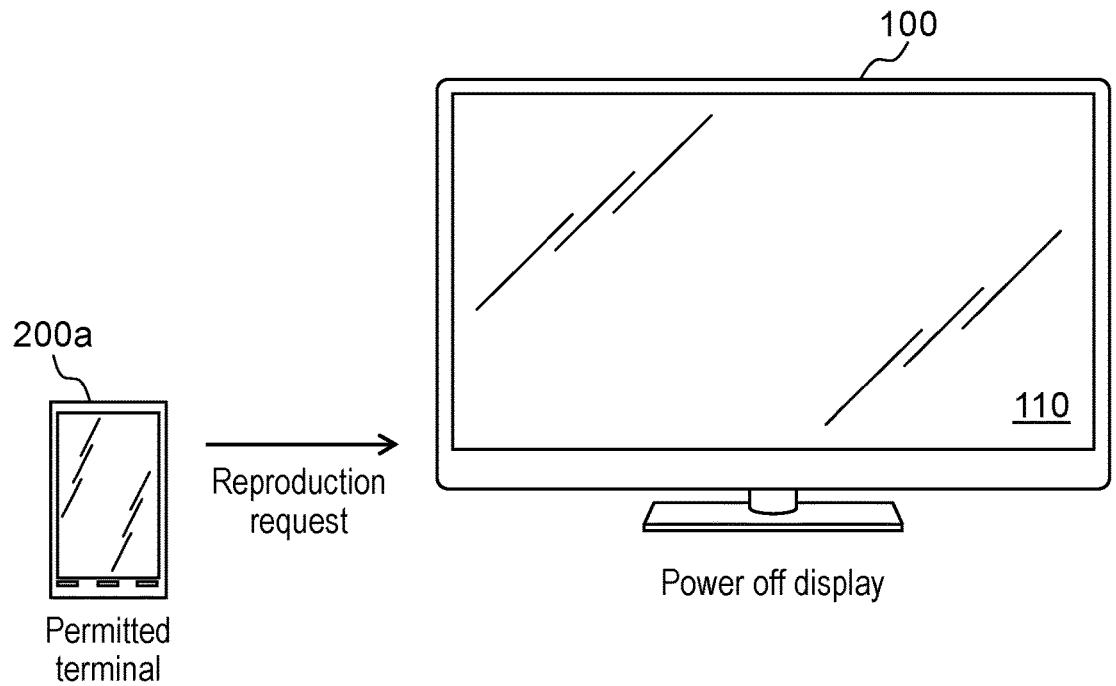
FIG. 5 is a view schematically illustrating an example of operation, which is performed by the reproducing device according to the first exemplary embodiment, when a reproduction request is received from a permitted terminal.
Figure 5:
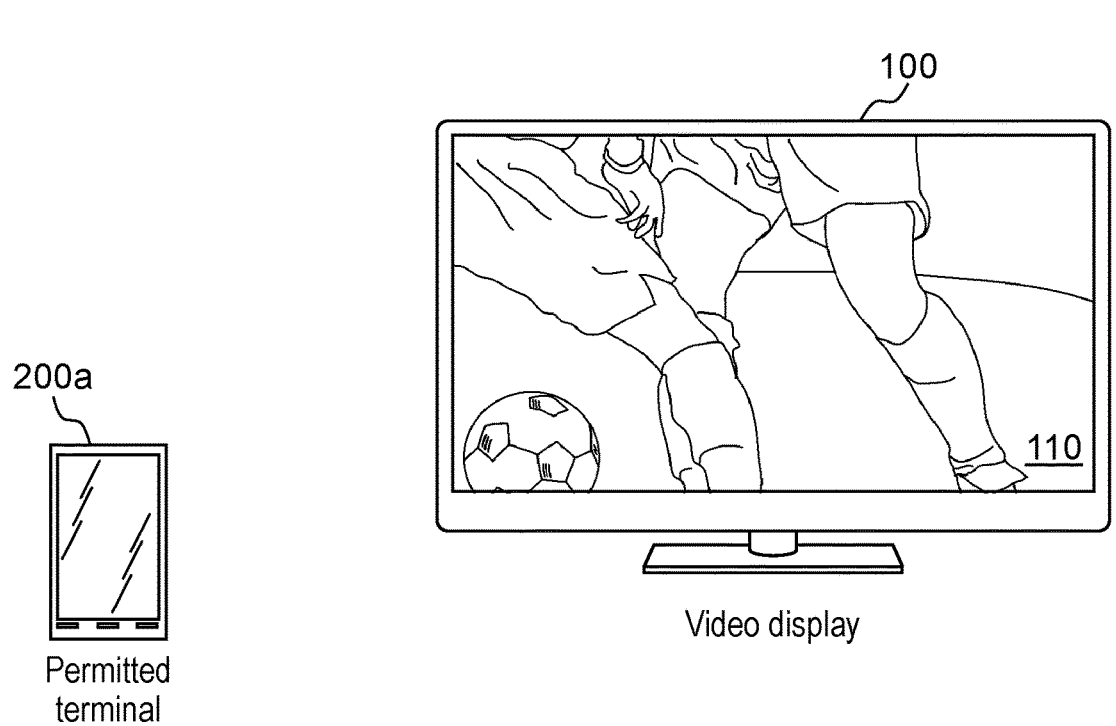
Figure 6:
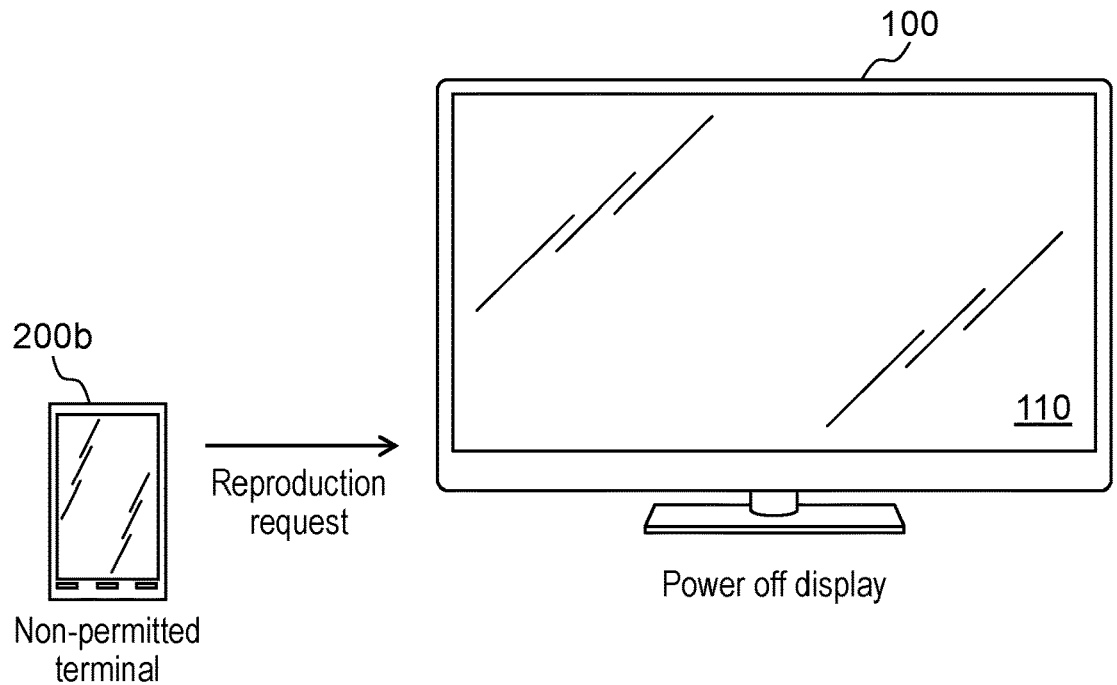
FIG. 6 is a view schematically illustrating an example of operation, which is performed by the reproducing device according to the first exemplary embodiment, when the reproduction request is received from a non-permitted terminal.
Figure 6:
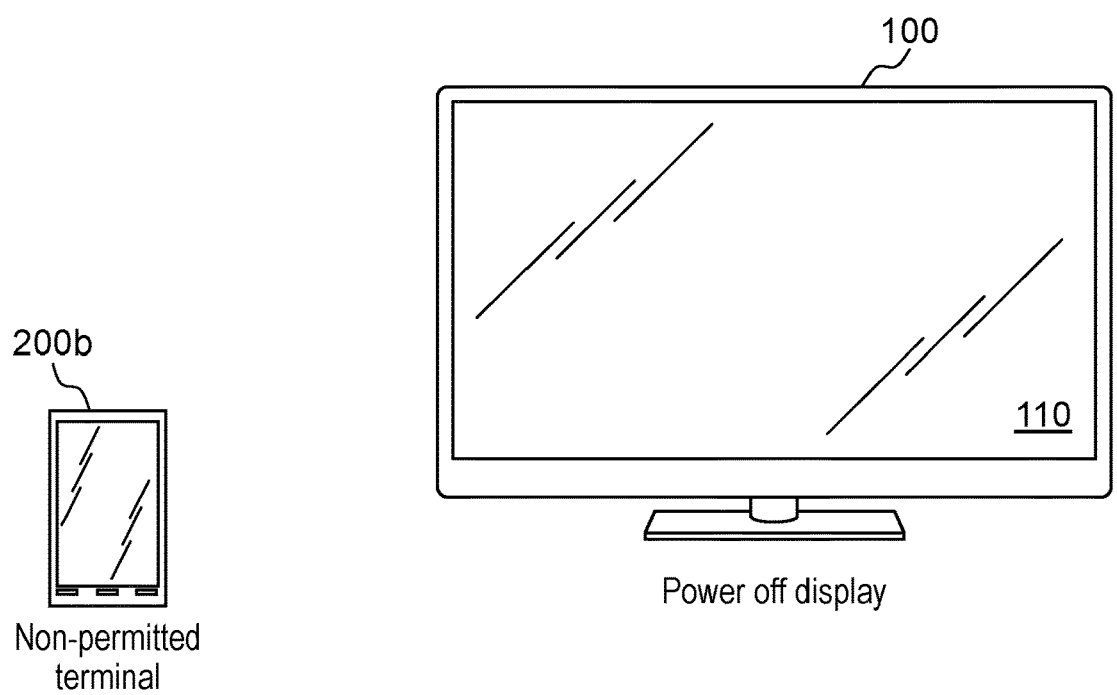

Specifically, in reproducing device 100, the operation as shown in FIGS. 5 and 6 is performed by being performed content reproduction starting processing.

First, the reproduction starting processing, which is performed by reproducing device 100 when reproducing device 100 receives the content reproduction request from the permitted terminal, will specifically be described with reference to FIG. 5.

FIG. 5 is a view schematically illustrating an example of the operation, which is performed by reproducing device 100 according to the first exemplary embodiment, when the reproduction request is received from the permitted terminal.

As illustrated in an upper part of FIG. 5, it is assumed that information terminal 200a that is the permitted terminal transmits the content (in FIG. 5, the video) reproduction request to reproducing device 100 by Wi-Fi Direct (®). In this case, in reproducing device 100, the reproduction request is received (step S11), and it is determined that whether information terminal 200a is the permitted terminal or not (step S12).

In the example of FIG. 5, information terminal 200a is the permitted terminal (Yes in step S12), and reproducer 110 (display) is powered off (No in step S13). Therefore, as illustrated in a lower part of FIG. 5, in reproducing device 100, reproducer 110 is powered on (step S14), and the video corresponding to the reproduction request is reproduced on the display of reproducer 110 (step S16).

Next, the reproduction starting processing, which is performed by reproducing device 100 when reproducing device 100 receives the content reproduction request from the non-permitted terminal, will specifically be described below with reference to FIG. 6.

FIG. 6 is a view schematically illustrating an example of operation, which is performed by reproducing device 100 according to the first exemplary embodiment, when the reproduction request is received from the non-permitted terminal.

As illustrated in an upper part of FIG. 6, it is assumed that information terminal 200b that is the non-permitted terminal transmits the content (in FIG. 6, the video) reproduction request to reproducing device 100 by Wi-Fi Direct (®). In this case, in reproducing device 100, the reproduction request is received (step S11), and it is determined that whether information terminal 200b is the permitted terminal or not (step S12).

In the example of FIG. 6, information terminal 200b is the non-permitted terminal (No in step S12). Therefore, as illustrated in a lower part of FIG. 6, in reproducing device 100, reproducer 110 (display) is maintained in the power-off state.

Thus, in reproducing device 100, whether reproducer 110 is powered on or maintained in the power-off state is decided according to whether information terminal 200 is the permitted terminal or the non-permitted terminal.

When recepter 150 receives the user operation on reproducing device 100 during the content reproduction, reproducing device 100 performs recording processing of recording the reception of the user operation. Details of the recording processing will be described below with reference to FIG. 7.

The user who performs the user operation on information terminal 200 may be identical to or different from the user who performs the user operation on reproducing device 100.

Figure 7:
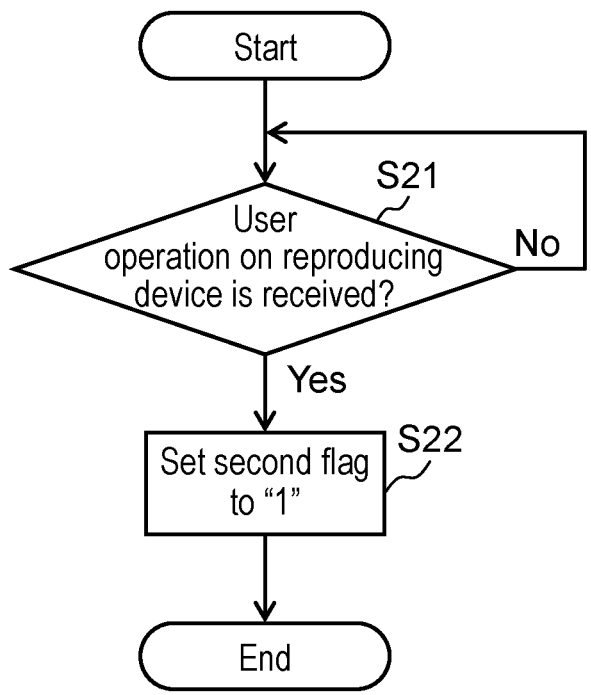
FIG. 7 is a flowchart illustrating an operation example of recording processing performed by the reproducing device according to the first exemplary embodiment.

FIG. 7 is a flowchart illustrating an operation example of the recording processing performed by reproducing device 100 according to the first exemplary embodiment. The recording processing is started after the reproduction starting processing in FIG. 4 is performed.

First, controller 130 determines whether recepter 150 has received the user operation on reproducing device 100 (step S21).

When it is determined in step S21 that recepter 150 has received the user operation on reproducing device 100 (Yes in step S21), controller 130 changes a value of a second flag from "0" to "1" (step S22).

The second flag indicates that recepter 150 has received the user operation on reproducing device 100. For example, the second flag is stored in storage 140.

On the other hand, when it is determined in step S21 that recepter 150 has not received the user operation on reproducing device 100 (No in step S21), controller 130 repeats the determination in step S21.

In reproducing device 100, the power of reproducer 110 is controlled according to the values of the first and second flags after the content reproduction is ended. Details of the control performed on the power of reproducer 110 will be described below with reference to FIG. 8.

Figure 8:
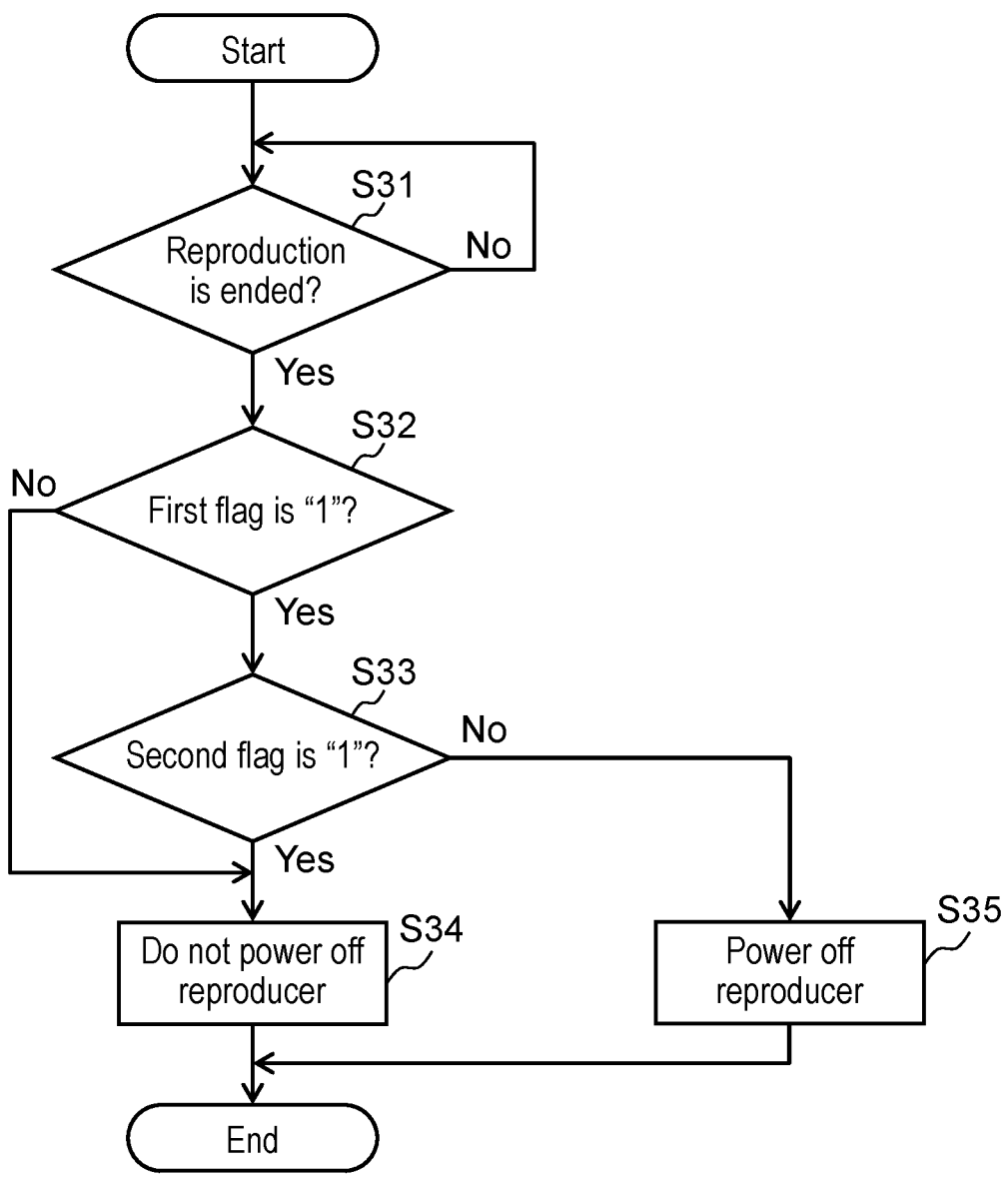
FIG. 8 is a flowchart illustrating an example of control performed on power of a reproducer with the reproducing device according to the first exemplary embodiment after content reproduction is ended.

FIG. 8 is a flowchart illustrating an example of the control performed on the power of reproducer 110 with reproducing device 100 according to the first exemplary embodiment after the content reproduction is ended.

First, controller 130 determines whether reproducer 110 has ended the content reproduction (step S31).

Then, when it is determined in step S31 that reproducer 110 has ended the content reproduction (Yes in step S31), controller 130 determines whether the value of the first flag is "1" (step S32).

On the other hand, when it is determined in step S31 that reproducer 110 has not ended the content reproduction (No in step S31), controller 130 repeats the determination in step S31. That is, controller 130 waits until reproducer 110 ends the content reproduction.

When it is determined in step S32 that the value of the first flag is "1" (Yes in step S32), controller 130 determines whether the value of the second flag is "1" (step S33).

That is, when reproducer 110 is powered on from the power-off state in response to the content reproduction request transmitted from the permitted terminal and then reproducer 110 ends the content reproduction, controller 130 determines whether recepter 150 has received the user operation on reproducing device 100 until the content reproduction is ended after reproducer 110 is powered on.

When it is determined in step S32 that the value of the first flag is "0" (No in step S32), or when it is determined in step S33 that the value of the second flag is "1" (Yes in step S33), controller 130 does not power off reproducer 110 (step S34). That is, controller 130 maintains reproducer 110 in the power-on state.

When it is determined in step S33 that the value of the second flag is "0" (No in step S33), controller 130 performs the second control to power off reproducer 110 (step S35).

As described above, when the value of the first flag is "1" and the value of the second flag is "0", controller 130 powers off reproducer 110 after the content reproduction is ended. That is, when reproducer 110 is powered on from the power-off state in response to the content reproduction request transmitted from the permitted terminal, and when recepter 150 has not received the user operation on reproducing device 100 during the content reproduction, controller 130 powers off reproducer 110 from the power-on state after the content reproduction is ended.

On the other hand, when the value of the first flag is "0", or the value of the second flag is "1", controller 130 maintains reproducer 110 in the power-on state even after the content reproduction is ended. That is, when reproducer 110 is not powered on in response to the reproduction request transmitted from the permitted terminal (that is, reproducer 110 is powered on before communicator 120 receives the content reproduction request from the permitted terminal), or when recepter 150 receives the user operation on reproducing device 100 before the content reproduction is ended, controller 130 maintains reproducer 110 in the power-on state even after the content reproduction is ended.

[1-3. Effect and the like]

As described above, in the present exemplary embodiment, the reproducing device includes the reproducer that reproduces the content, the communicator that establishes the direct wireless connection to the information terminal, and the controller. The controller determines whether the information terminal is a previously permitted information terminal when the communicator receives a content reproduction request from the information terminal through wireless connection. The controller performs first control to power on the reproducer, and issues an instruction to perform the content reproduction to the reproducer, when it is determined that the information terminal is the previously permitted information terminal and when the reproducer is powered off. The controller does not perform the first control when it is determined that the information terminal is not the previously permitted information terminal.

Reproducing device 100 is an example of the reproducing device. Reproducer 110 is an example of the reproducer. Communicator 120 is an example of the communicator. Controller 130 is an example of the controller. Information terminal 200 is an example of the information terminal. Wi-Fi Direct (®) is an example of the direct wireless connection between the reproducing device and the information terminal. Information terminal 200a is an example of the previously permitted information terminal. Information terminal 200b is an example of the previously non-permitted information terminal.

For example, in the configuration example of reproducing device 100 of the first exemplary embodiment, reproducing device 100 includes reproducer 110, communicator 120, and controller 130. Reproducer 110 reproduces the content. Reproducer 110 reproduces the content in response to the reproduction request transmitted from information terminal 200, which allows communicator 120 to establish the direct wireless connection to information terminal 200. When communicator 120 receives the content reproduction request from information terminal 200 through wireless connection, controller 130 determines whether information terminal 200 is the previously permitted information terminal. When it is determined that information terminal 200 is the previously permitted information terminal, and when reproducer 110 is powered off, controller 130 performs the first control to power on reproducer 110, and issues the instruction to reproduce the content to reproducer 110. When it is determined that information terminal 200 is not the previously permitted information terminal, controller 130 does not perform the first control.

Thus, when information terminal 200 that transmits the content reproduction request to reproducing device 100 is the previously permitted information terminal, even if the user operation on reproducing device 100 is not performed and reproducer 110 is powered off, reproducer 110 is powered on by receiving the reproduction request transmitted from information terminal 200, and reproducer 110 reproduces the content in response to the reproduction request. That is, even if the user operation to establish the wireless connection to reproducing device 100 is not performed on information terminal 200, by performing the user operation to transmit the content reproduction request from information terminal 200 to reproducing device 100 on information terminal 200, the wireless connection between information terminal 200 and reproducing device 100 is established to automatically power on reproducer 110, and reproducing device 100 executes reproduction of the content corresponding to the content reproduction request by wireless communication from information terminal 200. Accordingly, in the present exemplary embodiment, the user operation can be simplified when reproducing device 100 is operated on information terminal 200.

When controller 130 receives the content reproduction request by direct wireless connection (the wireless connection by Wi-Fi Direct (®)), and when information terminal 200 that has transmitted the reproduction request is the previously permitted information terminal, controller 130 powers on reproducer 110 based on the content reproduction request, and causes reproducer 110 to perform the content reproduction. In reproducing device 100 of the present exemplary embodiment, even for the reproduction request from a general-purpose information terminal implementing a protocol in which a power-on command is not defined, interconnectivity to information terminal 200 can be assured by the determination that the information terminal is the previously permitted information terminal. Then, reproducer 110 is automatically powered on, and reproducer 110 reproduces the content.

Controller 130 determines whether information terminal 200 is the previously permitted information terminal, and controller 130 does not perform the first control (that is, controller 130 does not power on reproducer 110) when the received reproduction request is the reproduction request from information terminal 200b that is not the previously permitted information terminal. Therefore, in reproducing device 100, reproducer 110 is prevented from being powered on in response to the reproduction request from the non-permitted information terminal.

In the reproducing device, when the content reproduction started in response to the content reproduction request is ended after the first control is performed, the controller may perform the second control to power off the reproducer.

For example, in the operation example of reproducing device 100 of the first exemplary embodiment, when the content reproduction started in response to the content reproduction request is ended after the first control is performed, controller 130 performs the second control to power off reproducer 110.

Therefore, in reproducing device 100, because controller 130 performs the second control to automatically power off reproducer 110, even if the user does not perform the power-off operation, reproducer 110 can automatically be returned to the original power-off state after the content reproduction is ended, even if the user operation to power off reproducer 110 is not performed.

In the reproducing device, the controller may not perform the second control when the user operation on reproducing device 100 is received until the content reproduction started in response to the content reproduction request is ended after the first control is performed.

For example, in the operation example of reproducing device 100 of the first exemplary embodiment, controller 130 does not perform the second control when the user operation on reproducing device 100 is received until the content reproduction started in response to the content reproduction request is ended after the first control is performed. That is, when the user operation on reproducing device 100 is received until the end of the content reproduction started in response to the content reproduction request, controller 130 does not perform the control to automatically power off reproducer 110 after the content reproduction is ended, but maintains reproducer 110 in the power-on state. Therefore, even if the user who performed the user operation on reproducing device 100 does not perform the operation to maintain reproducer 110 in the power-on state, the user can continuously use reproducing device 100 after the content reproduction is ended.

[1-4. First Modification]

Next, a first modification of the first exemplary embodiment will be described below with reference to FIG. 9.

In the reproduction starting processing of reproducing device 100 according to the first exemplary embodiment, the operation example is described in which, when receiving the reproduction request from information terminal 200 that is the non-permitted terminal, controller 130 repeats the determination as to whether the reproduction request is received. However, the present disclosure is not limited to this operation. For example, when receiving the reproduction request from information terminal 200 that is the non-permitted terminal, controller 130 may start authentication processing of authenticating the wireless connection.

The authentication processing, which is performed by controller 130 when reproducing device 100 receives the reproduction request from the non-permitted terminal, will be described below with reference to FIG. 9. Reproducing device 100 of the first modification of the first exemplary embodiment differs from reproducing device 100 of the first exemplary embodiment in that controller 130 performs the authentication processing in addition to the operation described in the first exemplary embodiment. However, other configurations of reproducing device 100 of the first modification are substantially identical to those of reproducing device 100 of the first exemplary embodiment. Therefore, the configuration of reproducing device 100 of the first modification is omitted.

Figure 9:
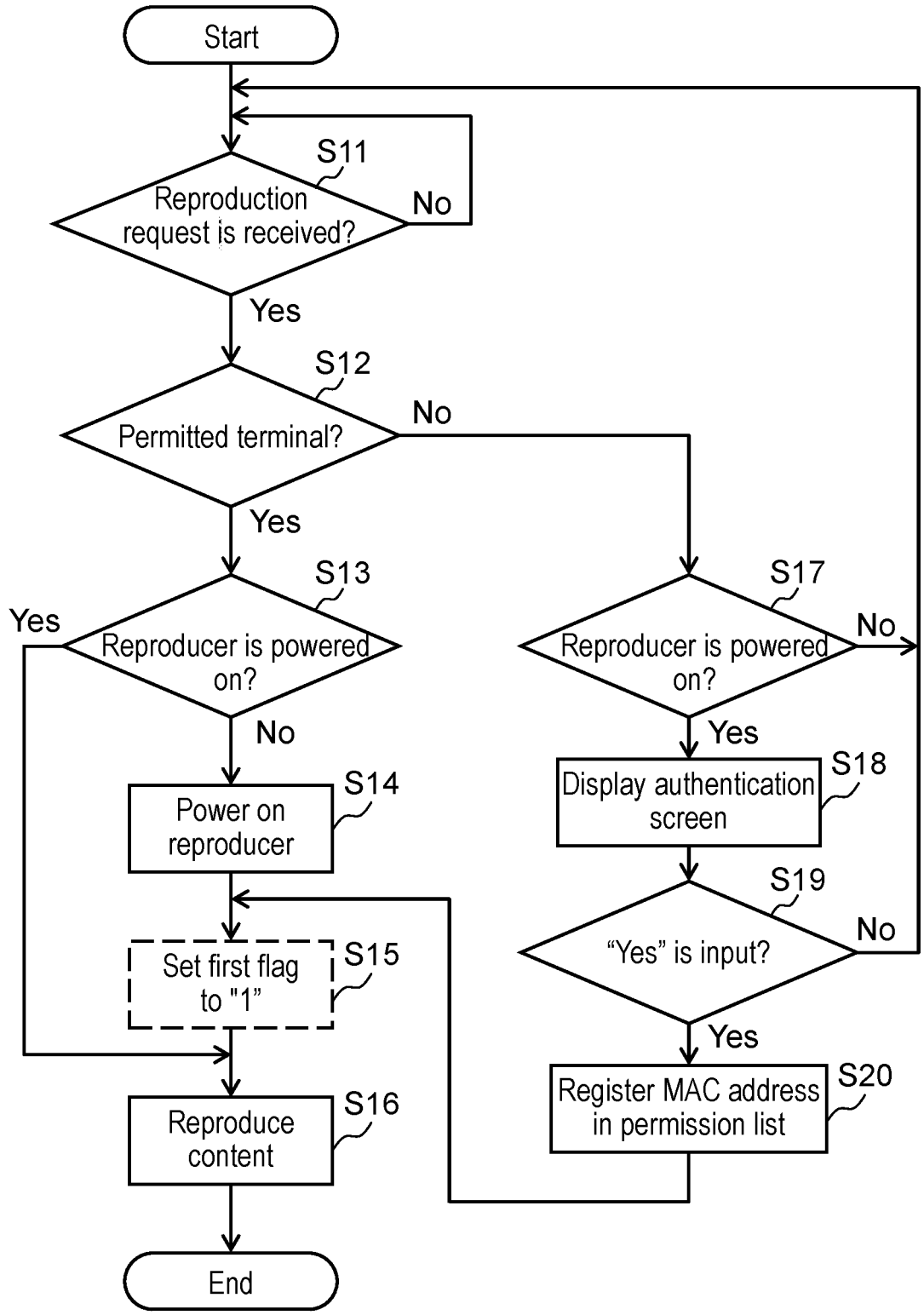
FIG. 9 is a flowchart illustrating an operation example of content reproduction starting processing performed by a reproducing device according to a first modification of the first exemplary embodiment.

FIG. 9 is a flowchart illustrating an operation example of the content reproduction starting processing performed by reproducing device 100 according to the first modification of the first exemplary embodiment.

The reproduction starting processing of the first modification of the first exemplary embodiment differs from the reproduction starting processing described in the first exemplary embodiment in processing after the determination of No is made in step S12. In the following description, because other pieces of processing of the first modification are substantially identical to those of the first exemplary embodiment, a difference from the operation described in the first exemplary embodiment will be described and description of the substantially identical processing will be omitted.

The reproduction starting processing of the first modification of the first exemplary embodiment in FIG. 9 is substantially identical to the reproduction starting processing of the first exemplary embodiment in the pieces of processing in steps S11 to S16. However, the reproduction starting processing of the first modification differs from the reproduction starting processing of first exemplary embodiment in that the pieces of processing in steps S17 to S20 (authentication processing) are further performed when the determination of No is made in step S12.

When the determination of No is made in step S12, controller 130 determines whether the reproducer 110 is powered on (step S17).

When it is determined in step S17 that reproducer 110 is powered off (No in step S17), controller 130 returns the processing to step S11.

When it is determined in step S17 that reproducer 110 is powered on (Yes in step S17), controller 130 causes reproducer 110 to output authentication information in order to ask the user whether the reproduction request is to be received from the non-permitted terminal (step S18).

In step S18, controller 130 causes on the display of reproducer 110 to display authentication screen 115 (see FIG. 10 to be described later) in order to ask the user whether the reproduction request is to be received from the non-permitted terminal. Alternatively, instead of displaying authentication screen 115 on the display in step S18, controller 130 may output voice from the loudspeaker in order to ask the user whether the reproduction request is to be received from the non-permitted terminal. Alternatively, controller 130 may perform both of the operations.

Then, controller 130 determines whether recepter 150 has received input (the input performed by the user, hereinafter referred to as "user input") indicating that the reproduction request is received from the non-permitted terminal (step S19).

In step S19, controller 130 determines whether recepter 150 has received or not the user input indicating that "YES" is selected on authentication screen 115 with accepter 160 or remote controller 300.

When it is determined in step S19 that recepter 150 has received the user input indicating that the reproduction request is received from the non-permitted terminal (Yes in step S19), controller 130 registers the MAC address obtained from information terminal 200 in permission list 141 (step S20), and proceeds the processing to step S15.

On the other hand, when it is determined in step S19 that recepter 150 has not received the user input indicating that the reproduction request is received from the non-permitted terminal (No in step S19), controller 130 returns the processing to step S11.

In step S19, controller 130 may make the determination of No in step S19 when recepter 150 receives the user input indicating that "NO" is selected on authentication screen 115 with accepter 160 or remote controller 300.

Next, the reproduction starting processing, which is performed by controller 130 when reproducing device 100 according to the first modification of the first exemplary embodiment receives the reproduction request from non-permitted terminal, will specifically be described below with reference to FIG. 10.

Figure 10:
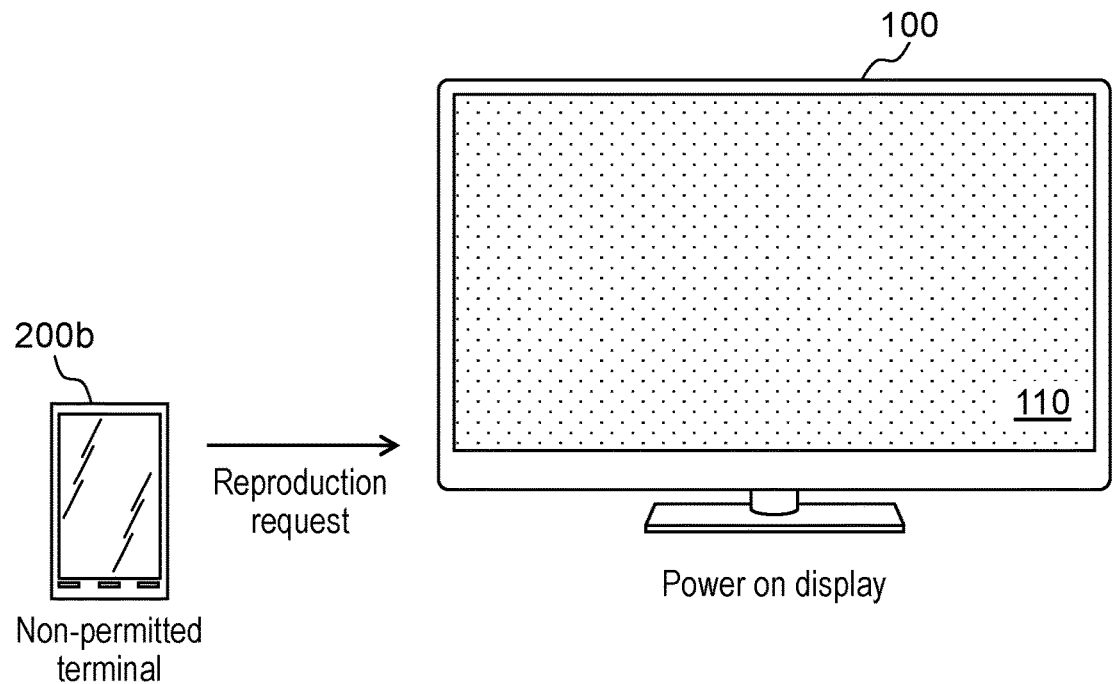
FIG. 10 is a view schematically illustrating an example of operation, which is performed by the reproducing device according to the first modification of the first exemplary embodiment when the reproduction request is received from the non-permitted terminal.
Figure 10:
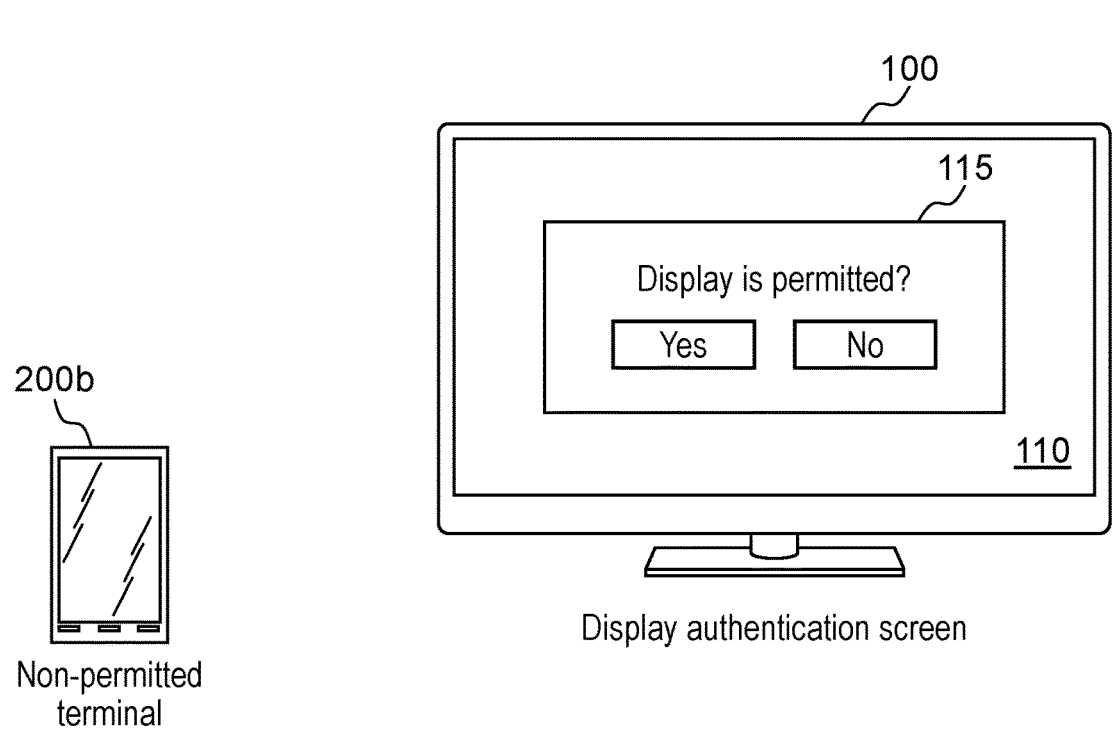

FIG. 10 is a view schematically illustrating an example of operation, which is performed by reproducing device 100 according to the first modification of the first exemplary embodiment when the reproduction request is received from the non-permitted terminal.

As illustrated in an upper part of FIG. 10, it is assumed that information terminal 200b that is the non-permitted terminal transmits the content (in FIG. 10, the video) reproduction request to reproducing device 100 by Wi-Fi Direct (®). In this case, in reproducing device 100, the reproduction request is received (step S11), and it is determined that whether information terminal 200b is the permitted terminal (step S12).

In the example illustrated in FIG. 10, information terminal 200b is the non-permitted terminal (No in step S12), and reproducer 110 (display) is powered on (Yes in step S17). Therefore, as illustrated in a lower part of FIG. 10, in reproducing device 100, authentication screen 115 is displayed on the display of reproducer 110 (step S18).

After step S18, when recepter 150 receives the user input indicating that "YES" is selected on authentication screen 115 (Yes in step S19), the MAC address of information terminal 200b is registered in permission list 141 (step S20), and reproducer 110 reproduces the video of the content according to the reproduction request from information terminal 200b (step S16).

After step S18, when recepter 150 receives the user input indicating that "NO" is selected on authentication screen 115 (No in step S19), reproducer 110 does not reproduce the content, and the processing returns to step S11.

As described above, in reproducing device 100 according to the first modification, the authentication processing is performed next even when information terminal 200 is determined to be the non-permitted terminal in step S12. Then, if the user permits the non-permitted terminal in the authentication processing, in reproducing device 100 according to the first modification, the terminal information about the non-permitted terminal is registered in the permission list, and reproducer 110 reproduces the content corresponding to the reproduction request from the non-permitted terminal.

[1-5. Second Modification]

A second modification of the first exemplary embodiment will be described below with reference to FIG. 11.

The controller of the reproducing device may power off the reproducer in the case where the content reproduction started in response to the reproduction request is ended by the user operation received from the information terminal.

For example, in the configuration example of the first exemplary embodiment, controller 130 of reproducing device 100 may power off reproducer 110 when the content reproduction started in response to the reproduction request is ended by the user operation received from information terminal 200.

Specifically, after reproducer 110 is powered on in response to the reproduction request from information terminal 200 to start the content reproduction in reproducer 110, when recepter 150 receives a content reproduction stopping request from information terminal 200 while reproducer 110 reproduces the content, controller 130 may power off reproducer 110. The processing in this case will be described with reference to FIG. 11. Because reproducing device 100 according to the second modification of the first exemplary embodiment is substantially identical to reproducing device 100 of the first exemplary embodiment, the detailed description is omitted.

Figure 11:
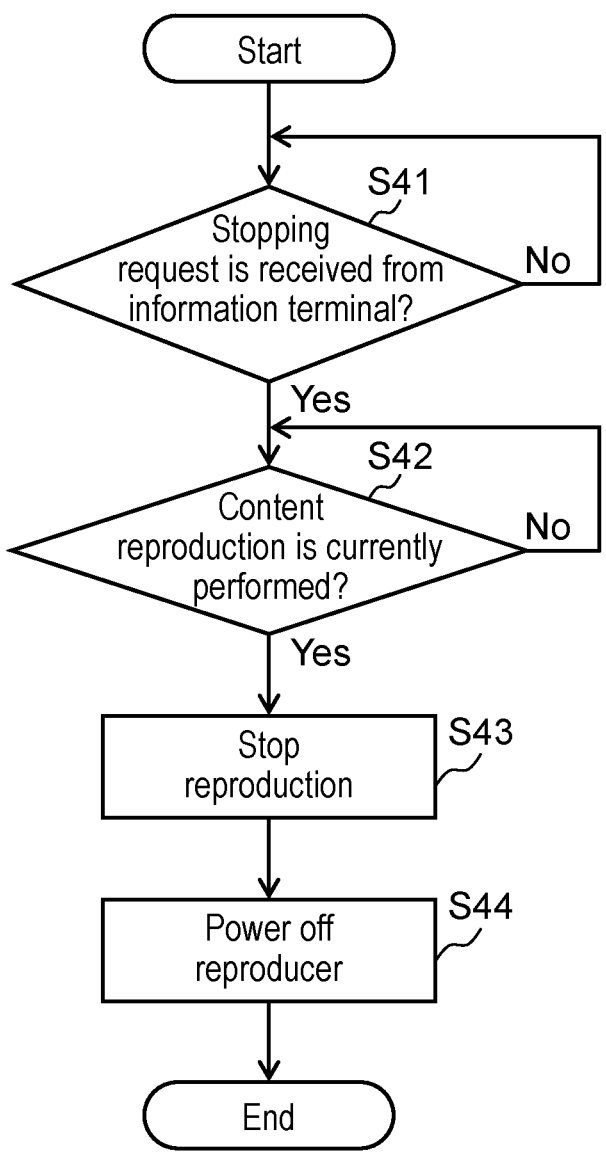
FIG. 11 is a flowchart illustrating an example of operation, which is performed by the reproducing device according to a second modification of the first exemplary embodiment when a stopping request is received from the information terminal.

FIG. 11 is a flowchart illustrating an example of operation, which is performed by reproducing device 100 according to the second modification of the first exemplary embodiment when the stopping request is received from information terminal 200.

First, controller 130 determines whether recepter 150 has received the stopping request from information terminal 200 (step S41).

When it is determined in step S41 that recepter 150 has received the stopping request from information terminal 200 (Yes in step S41), controller 130 determines whether the content reproduction is currently performed (step S42).

On the other hand, when it is determined in step S41 that recepter 150 has not received the stopping request from information terminal 200 (No in step S41), controller 130 repeats the determination in step S41.

When it is determined in step S42 that the content reproduction is not currently performed (No in step S42), controller 130 repeats the determination in step S42.

When it is determined in step S42 that the content reproduction is currently performed (Yes in step S42), controller 130 stops the content reproduction (step S43), and powers off reproducer 110 (step S44).

Thus, in reproducing device 100 according to the second modification of the first exemplary embodiment, the user who operates reproducing device 100 from information terminal 200 can power off reproducer 110 by making the content reproduction stopping request using information terminal 200, without performing the user operation to power off reproducer 110. Accordingly, the user operation can be simplified.

[1-6. Third Modification]

In the first exemplary embodiment, the operation example is described in which reproducing device 100 performs the reproduction starting processing when the content reproduction request is received from information terminal 200 that is the permitted terminal. However, the present disclosure is not limited to this operation example. For example, instead of receiving the content reproduction request from information terminal 200, reproducing device 100 may perform the reproduction starting processing when a communication connection request is received from information terminal 200.

Second Exemplary Embodiment

Next, a second exemplary embodiment will be described below with reference to FIGS. 12 and 13.

[2-1. Configuration]

Figure 12:
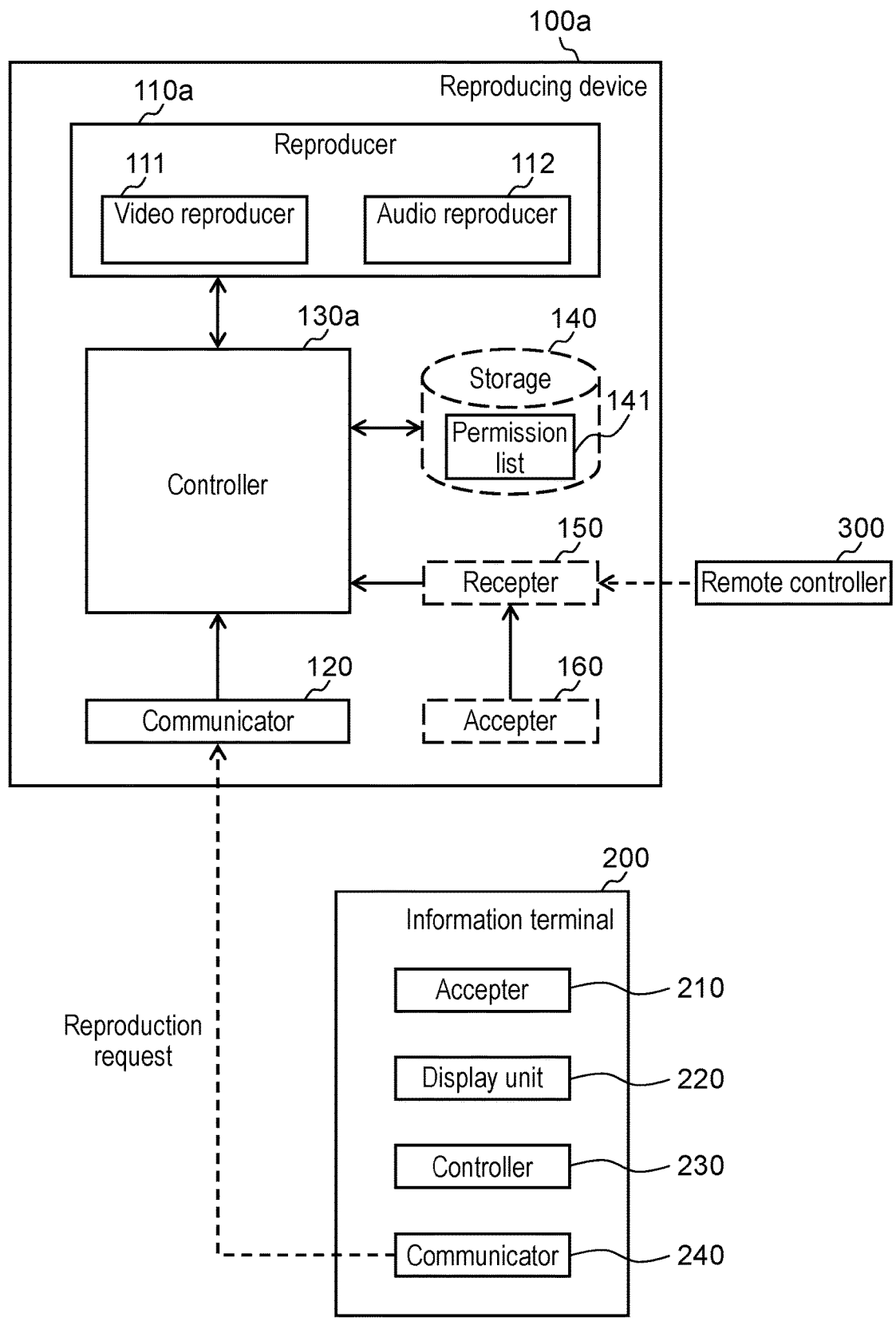
FIG. 12 is a block diagram schematically illustrating configuration examples of a reproducing device and an information terminal according to a second exemplary embodiment.

FIG. 12 is a block diagram schematically illustrating configuration examples of reproducing device 100a and information terminal 200 of the second exemplary embodiment.

Information terminal 200 of the second exemplary embodiment has the substantially same configuration as information terminal 200 of the first exemplary embodiment. Reproducing device 100a of the second exemplary embodiment has the substantially same configuration as reproducing device 100 of the first exemplary embodiment. However, reproducing device 100a of the second exemplary embodiment differs from reproducing device 100 of the first exemplary embodiment in that the configuration of reproducer 110a is different from the configuration of reproducer 110 of reproducing device 100. The reproduction starting processing performed by controller 130a of reproducing device 100a differs from the reproduction starting processing performed by controller 130 of reproducing device 100.

Reproducing device 100a of the second exemplary embodiment will be described below. However, a difference from reproducing device 100 of the first exemplary embodiment will mainly be described below.

Reproducer 110a includes video reproducer 111 that reproduces the video and audio reproducer 112 that reproduces the sound. In reproducer 110a, video reproducer 111 and the audio reproducer 112 can independently be powered on. However, when the reproducer 110a is powered off, both of video reproducer 111 and audio reproducer 112 are powered off.

Video reproducer 111 outputs the video signal by reproducing video data such as a moving image and a still image. For example, video reproducer 111 is implemented by a processor, a memory in which a program is stored, and the like. Not only video reproducer 111 outputs the video signal generated by the reproduction of the video data, but also video reproducer 111 may include a monitor that outputs (displays) the video obtained from the video signal. That is, video reproducer 111 may include, for example, not only the processor and the memory, but also a display that outputs the video.

Audio reproducer 112 outputs the audio signal by reproducing audio data such as music. For example, audio reproducer 112 is implemented by a processor, a memory in which a program is stored, and the like. Not only audio reproducer 112 outputs the audio signal generated by the reproduction of the audio data, but also audio reproducer 112 may include a loudspeaker that outputs the sound obtained from the audio signal. That is, audio reproducer 112 may include not only the processor and the memory, but also a loudspeaker (including an amplifier) that outputs the sound.

Controller 130a determines a type of the content corresponding to the reproduction request transmitted from information terminal 200. When reproducer 110a is powered off, controller 130a individually controls the power of video reproducer 111 and the power of audio reproducer 112 according to a determination result of the content type.

Specifically, when it is determined that the content type is the video, and when reproducer 110a is powered off, controller 130a powers on not audio reproducer 112 but video reproducer 111, and issues the instruction to reproduce the content to video reproducer 111.

When it is determined that the content type is the sound, and when reproducer 110a is powered off, controller 130a powers on not video reproducer 111 but audio reproducer 112, and issues the instruction to reproduce the content to audio reproducer 112.

[2-2. Operation]

Operation of reproducing device 100a having the above configuration will be described below.

When receiving the content reproduction request from information terminal 200, reproducing device 100a performs the reproduction starting processing of reproducing the content corresponding to the reproduction request.

Details of the reproduction starting processing performed by reproducing device 100a will be described below with reference to FIG. 13.

Figure 13:
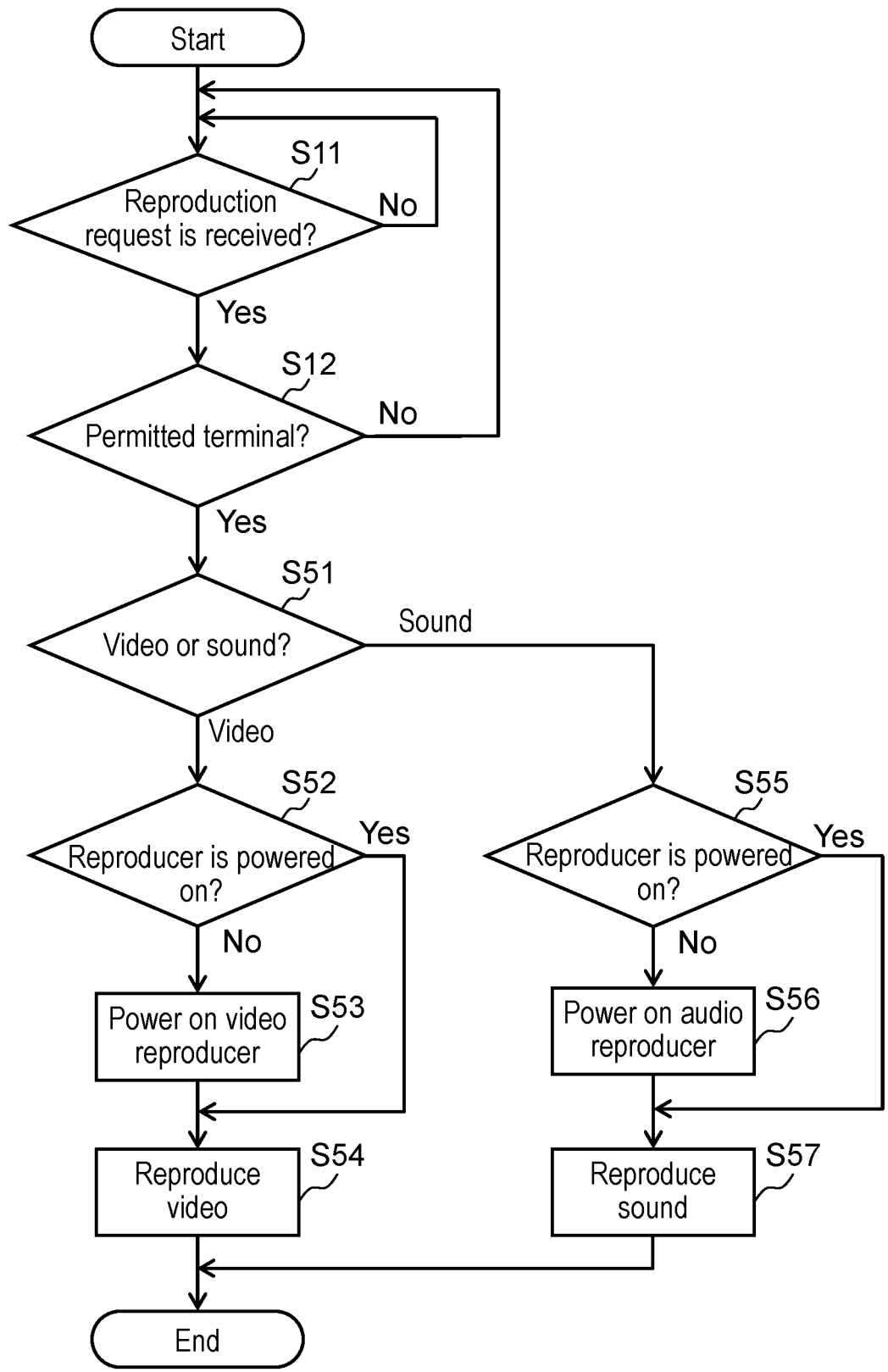
FIG. 13 is a flowchart illustrating an operation example of content reproduction starting processing performed by the reproducing device according to the second exemplary embodiment.

FIG. 13 is a flowchart illustrating an operation example of the content reproduction starting processing performed by reproducing device 100a according to the second exemplary embodiment.

Note that, the reproduction starting processing of the second exemplary embodiment is substantially identical to the reproduction starting processing of the first exemplary embodiment except for part of processing.

Specifically, the reproduction starting processing of the second exemplary embodiment is substantially identical to the reproduction starting processing of the first exemplary embodiment in the pieces of processing in steps S11 and S12. However, when the determination of Yes is made in step S12, the pieces of processing in steps S51 to S57 are performed instead of the pieces of processing in steps S13 to S16 performed in the reproduction starting processing of the first exemplary embodiment. The reproduction starting processing of the second exemplary embodiment differs from the reproduction starting processing of the first exemplary embodiment in this point.

A difference from the reproduction starting processing of the first exemplary embodiment will be described below, and the substantially same processing is omitted.

When the determination of Yes is made in step S12, controller 130a determines whether the type of the content corresponding to the reproduction request transmitted from information terminal 200 is the video or the sound (step S51).

When it is determined in step S51 that the content type is the video (video in step S51), controller 130a determines whether reproducer 110a is powered on (step S52).

When it is determined in step S52 that reproducer 110a is powered off (No in step S52), controller 130a powers on not audio reproducer 112 but video reproducer 111 (step S53), and issues the instruction to reproduce the content to video reproducer 111 (step S54).

When it is determined in step S52 that reproducer 110a is powered on (Yes in step S52), controller 130a issues the instruction to reproduce the content to video reproducer 111 (step S54).

Upon reception of the instruction from controller 130a in step S54, video reproducing unit 111 starts the content reproduction.

When it is determined in step S51 that the content type is the sound (sound in step S51), controller 130a determines whether reproducer 110a is powered on (step S55).

When it is determined in step S55 that reproducer 110a is powered off (No in step S55), controller 130a powers on not video reproducer 111 but audio reproducer 112 (step S56), and issues the instruction to reproduce the content to audio reproducer 112 (step S57).

When it is determined in step S55 that reproducer 110a is powered on (Yes in step S55), controller 130a issues the instruction to reproduce the content to audio reproducer 112 (step S57).

Upon reception of the instruction from controller 130a in step S57, audio reproducing unit 112 starts the content reproduction.

[2-3. Effect and the Like]

As described above, in the present exemplary embodiment, the reproducer of the reproducing device includes the video reproducer that reproduces the video and the audio reproducer that reproduces the sound. The controller of the reproducing device determines the type of the contents that is a target of the reproduction request. When the reproducer is powered off, the controller individually controls the power of the video reproducer and the power of the audio reproducer according to the determination result.

Reproducing device 100a is an example of the reproducing device. Reproducer 110a is an example of the reproducer. Video reproducer 111 is an example of the video reproducer. Audio reproducer 112 is an example of the audio reproducer.

For example, in the configuration example of reproducing device 100a of the second exemplary embodiment, reproducer 110a of reproducing device 100a includes video reproducer 111 that reproduces the video and audio reproducer 112 that reproduces the sound. Controller 130a of reproducing device 100a determines the type of the contents that is the reproduction request target. When reproducer 110a is powered off, controller 130a individually controls the power of video reproducer 111 and the power of audio reproducer 112 according to the determination result.

Therefore, in reproducing device 100a, the power of video reproducer 111 and the power of audio reproducer 112 can individually be controlled according to the type of the content corresponding to the reproduction request transmitted from information terminal 200. Accordingly, reproducing device 100a can power on only the reproducer used in the content reproduction designated by the user, so that power consumption associated with the content reproduction can be reduced.

In the reproducing device, when it is determined that the content type is the video, and when the reproducer is powered off, the controller may power on not the audio reproducer but the video reproducer, and issue the instruction to reproduce the content to the video reproducer. When it is determined that the content type is the sound, and when the reproducer is powered off, the controller may power on not the video reproducer but the audio reproducer, and issue the instruction to reproduce the content to the audio reproducer.

For example, in the configuration example of reproducing device 100a of the second exemplary embodiment, when it is determined that the content type is the video, and when reproducer 110a is powered off, controller 130a powers on not audio reproducer 112 but video reproducer 111, and issues the instruction to reproduce the content to video reproducer 111. When it is determined that the content type is the sound, and when reproducer 110a is powered off, controller 130a powers on not video reproducer 111 but audio reproducer 112, and issues the instruction to reproduce the content to audio reproducer 112.

Therefore, when the type of the content corresponding to the reproduction request transmitted from information terminal 200 is the video, reproducing device 100a can power on not audio reproducer 112 but video reproducer 111 to reproduce the content (video). When the type of the content corresponding to the reproduction request transmitted from information terminal 200 is the sound, reproducing device 100a can power on not video reproducer 111 but audio reproducer 112 to reproduce the content (sound). Reproducing device 100a can thus power on only one of video reproducer 111 and audio reproducer 112 according to the type of the content corresponding to the reproduction request. Therefore, reproducing device 100a can power on only the reproducer (one of video reproducer 111 and audio reproducer 112) used to reproduce the content (one of the video and the sound) designated by the user. Accordingly, the power consumption associated with the content reproduction can be reduced in reproducing device 100a.

[2-4. First Modification]

In the second exemplary embodiment, the operation example is described in which controller 130a determines whether the content type is the video or the sound. However, the present disclosure is not limited to this operation example. For example, controller 130a may further determine whether both of the video and the sound are included in the content type. When both of the video and the sound are included in the content type, and when reproducer 110a is powered off, controller 130a may power on both of video reproducer 111 and audio reproducer 112, and issue the instruction to reproduce the content (the video and the sound) to video reproducer 111 and audio reproducer 112.

[2-5. Second Modification]

In the second exemplary embodiment, the operation example is described in which controller 130a determines whether reproducer 110a is powered on in steps S52 and S55. However, the present disclosure is not limited to this operation example. For example, controller 130a may determine whether video reproducer 111 of reproducer 110a is powered on in step S52. Controller 130a may determine whether audio reproducer 112 of reproducer 110a is powered on in step S55.

[2-6. Third Modification]

In the second exemplary embodiment, the operation example is described in which, when it is determined that reproducer 110a is powered on in step S52, controller 130a issues the instruction to reproduce the video to video reproducer 111. However, the present disclosure is not limited to this operation example. In this case, for example, when audio reproducer 112 is powered on, controller 130a may power off audio reproducer 112, and issue the instruction to reproduce the video to video reproducer 111.

In the second exemplary embodiment, the operation example is described in which, when it is determined that reproducer 110a is powered on in step S55, controller 130a issues the instruction to reproduce the sound to audio reproducer 112. However, the present disclosure is not limited to this operation example. In this case, for example, when video reproducer 111 is powered on, controller 130a may power off video reproducer 111, and issue the instruction to reproduce the sound to audio reproducer 112.

Third Exemplary Embodiment

Next, a third exemplary embodiment will be described below with reference to FIGS. 14 to 18.

[3-1. Configuration]

Figure 14:
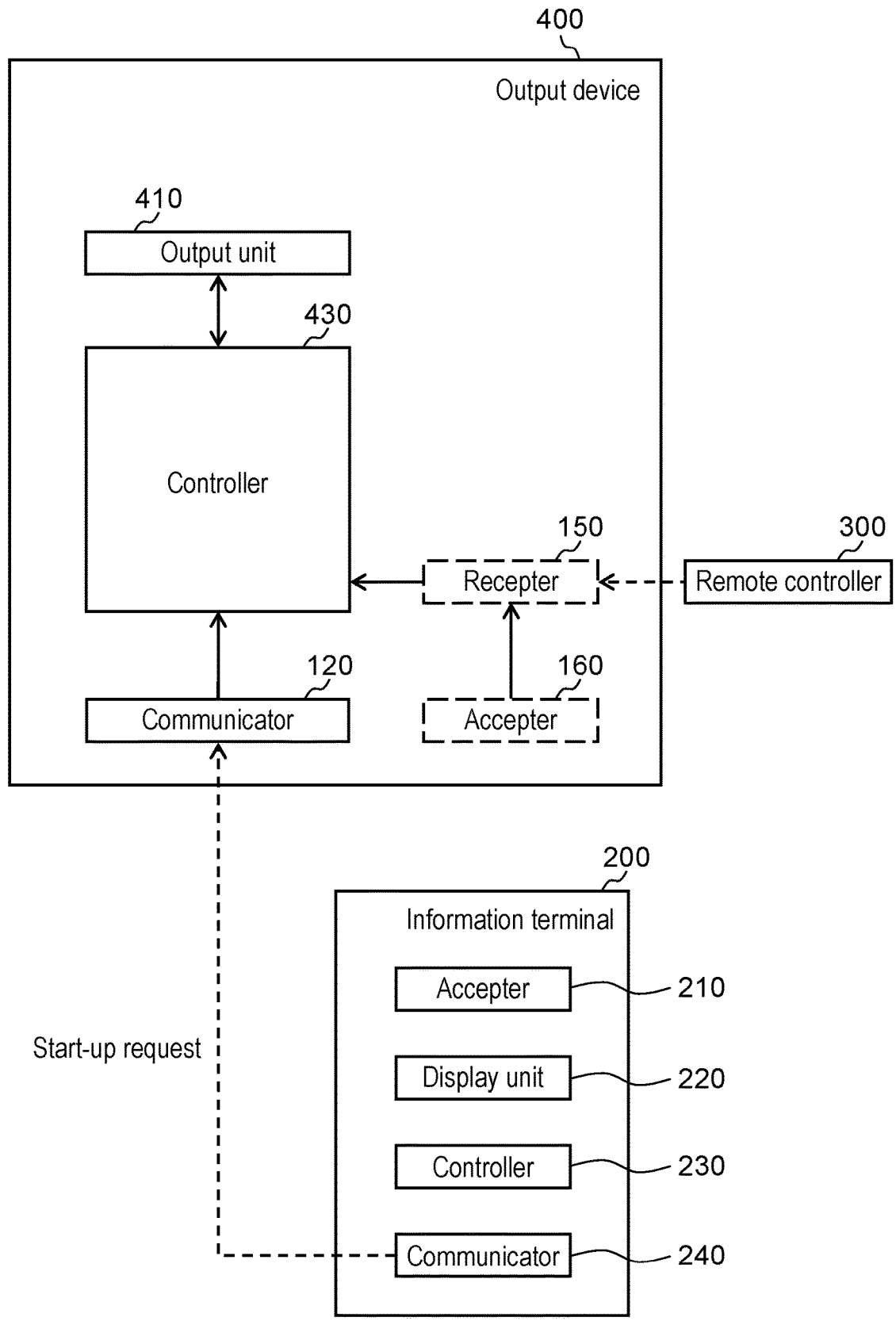
FIG. 14 is a block diagram schematically illustrating configuration examples of an output device and an information terminal according to a third exemplary embodiment.

FIG. 14 is a block diagram schematically illustrating configuration examples of output device 400 and information terminal 200 of the third exemplary embodiment.

Information terminal 200 of the third exemplary embodiment has the substantially same configuration as information terminal 200 of the first exemplary embodiment. Output device 400 of the third exemplary embodiment has the substantially same configuration as reproducing device 100 of the first exemplary embodiment. However, output device 400 of the third exemplary embodiment differs from reproducing device 100 of the first exemplary embodiment in that output device 400 includes output unit 410 instead of reproducer 110. Controller 430 of output device 400 differs from controller 130 of reproducing device 100 in operation.

Output device 400 is a device that can output the video and the sound. In the present exemplary embodiment, output device 400 is the TV. Alternatively, output device 400 may be a recorder, a set-top box, and the like.

Output device 400 of the third exemplary embodiment will be described below. However, a difference from reproducing device 100 of the first exemplary embodiment will mainly be described below.

Output unit 410 outputs at least one of the video and the sound. Specifically, output unit 410 outputs at least one of the video and sound, which are generated with controller 430 by the start-up of the application.

Output unit 410 includes a monitor that outputs (displays) the video obtained from the video signal output from controller 430 and a loudspeaker that outputs the sound obtained from the audio signal output from controller 430. For example, output unit 410 includes a processor, a memory in which a program is stored, a display that outputs the video, a loudspeaker (including an amplifier) that outputs the sound, and the like.

When communicator 120 receives an application start-up request transmitted from information terminal 200 through wireless connection such as Wi-Fi Direct (®), and when output unit 410 is powered off, controller 430 performs the first control to power on output unit 410, and issues the instruction to output at least one of the video and sound, which are generated by the start-up of the application, to output unit 410.

When the application started up in response to the start-up request is ended after the first control is performed, controller 430 performs the second control to power off output unit 410.

Controller 430 may not perform the second control when the user operation on output device 400 is received until the application started up in response to the application start-up request is ended after the first control is performed. The user operation on output device 400 refers to substantially the same operation as the user operation on reproducing device 100 described in the first exemplary embodiment.

[3-2. Operation]

Operation of output device 400 having the above configuration will be described below.

When receiving the application start-up request from information terminal 200, output device 400 performs processing of starting up the application corresponding to the application start-up request (hereinafter, referred to as "start-up processing"). Details of the start-up processing performed by output device 400 will be described below with reference to FIG. 15. In the present exemplary embodiment, the application start-up request may be simply referred to as "start-up request".

Figure 15:
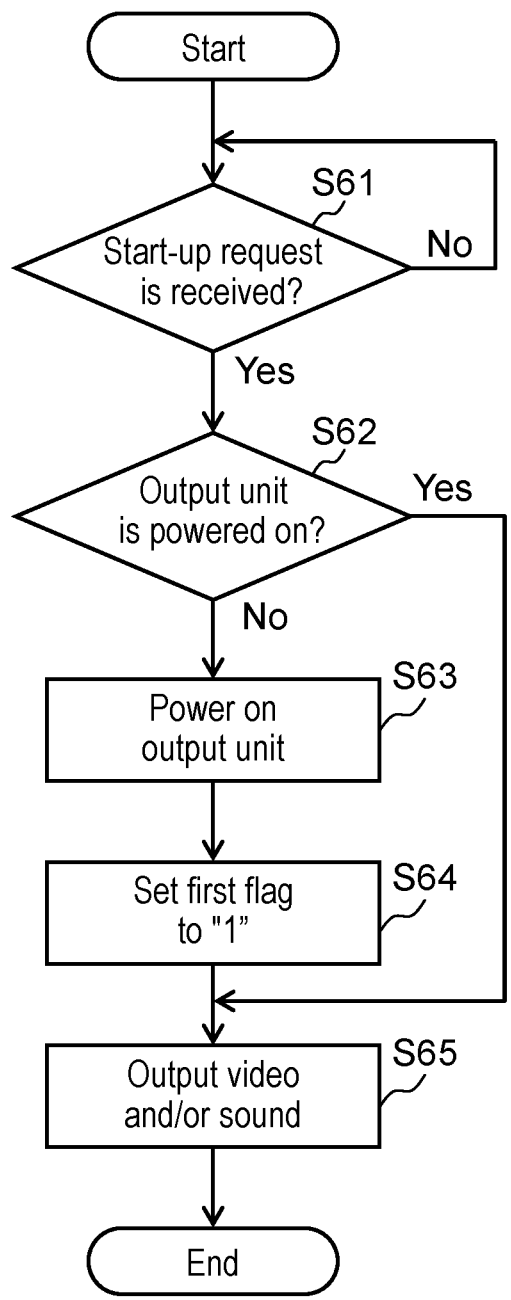
FIG. 15 is a flowchart illustrating an operation example of application start-up processing performed by the output device according to the third exemplary embodiment.

FIG. 15 is a flowchart illustrating an operation example of the application start-up processing performed by output device 400 according to the third exemplary embodiment.

First, controller 430 determines whether communicator 120 has received the application start-up request from information terminal 200 (step S61).

Specifically, controller 430 determines whether communicator 120 has received the application start-up request from information terminal 200 to which the communication connection is established by Wi-Fi Direct (®). The application start-up request may include information specifying a specific application.

Then, when it is determined in step S61 that communicator 120 has received the application start-up request from information terminal 200 (Yes in step S61), controller 430 determines whether output unit 410 is powered on (step S62).

On the other hand, when it is determined in step S61 that communicator 120 has not received the application start-up request from information terminal 200 (No in step S61), controller 430 repeats the determination in step S61. That is, controller 430 waits until communicator 120 receives the application start-up request from information terminal 200.

When it is determined in step S62 that output unit 410 is powered on (Yes in step S62), controller 430 goes to processing in step S65.

When it is determined in step S62 that output unit 410 is not powered on (No in step S62), controller 430 performs the first control to power on output unit 410 (step S63).

Controller 430 changes the value of the first flag from "0" to "1" (step S64).

The first flag is a flag that indicates that output unit 410 is powered on (the first control is performed) by the application start-up request transmitted from information terminal 200, and the first flag becomes "1" when output unit 410 changes from the power-off state to the power-on state by the application start-up request transmitted from information terminal 200. Accordingly, the first flag is "0" when output unit 410 is powered off. The first flag is also "0" even when output unit 410 is already powered on before communicator 120 receives the application start-up request from information terminal 200. Accordingly, the first flag is "0" when the determination of Yes is made in step S62. For example, the first flag is stored in a storage (not illustrated) such as a memory.

Then, controller 430 executes the application corresponding to the start-up request, and issues an instruction to output the video and/or sound generated by the execution of the application to output unit 410 (step S65). Upon reception of the instruction, output unit 410 outputs the generated video and/or sound.

When recepter 150 receives the user operation on output device 400 during the execution of the application, output device 400 performs the recording processing of recording the reception of the user operation. Details of the recording processing will be described below with reference to FIG. 16.

The user who performs the user operation on information terminal 200 may be identical to or different from the user who performs the user operation on output device 400. Hereinafter, output of the video and/or sound generated by the execution of the application with output unit 410 is also included in "the execution of the application".

Figure 16:
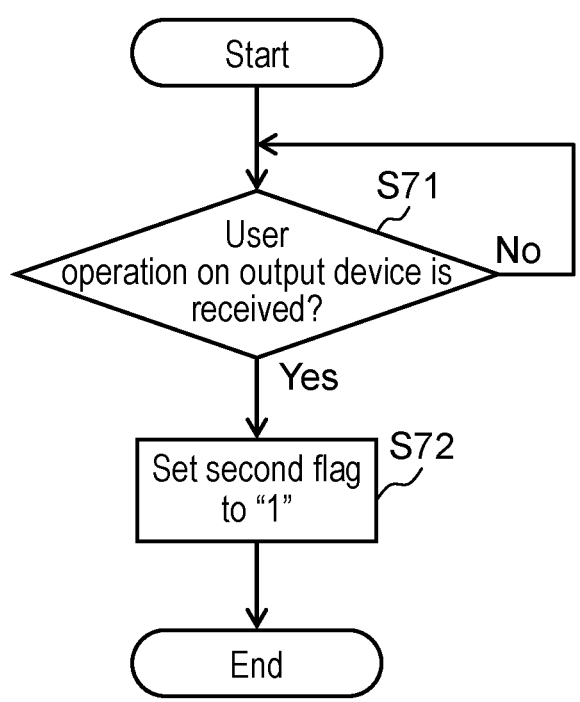
FIG. 16 is a flowchart illustrating an operation example of recording processing performed by the output device according to the third exemplary embodiment.

FIG. 16 is a flowchart illustrating an operation example of the recording processing performed by output device 400 according to the third exemplary embodiment. The recording processing is started after the start-up processing illustrated in FIG. 15 is performed.

First, controller 430 determines whether recepter 150 has received the user operation on output device 400 (step S71).

When it is determined in step S71 that recepter 150 has received the user operation on output device 400 (Yes in step S71), controller 430 changes the value of the second flag from "0" to "1" (step S72).

The second flag is a flag that indicates that recepter 150 has received the user operation on output device 400. For example, the second flag is stored in a storage (not illustrated) such as a memory.

On the other hand, when it is determined in step S71 that recepter 150 has not received the user operation on output device 400 (No in step S71), controller 430 repeats the determination in step S71.

In output device 400, the power of output unit 410 is controlled according to the values of the first flag and second flag after (the execution of) the application is ended. Details of the control performed on output unit 410 will be described below with reference to FIG. 17.

Figure 17:
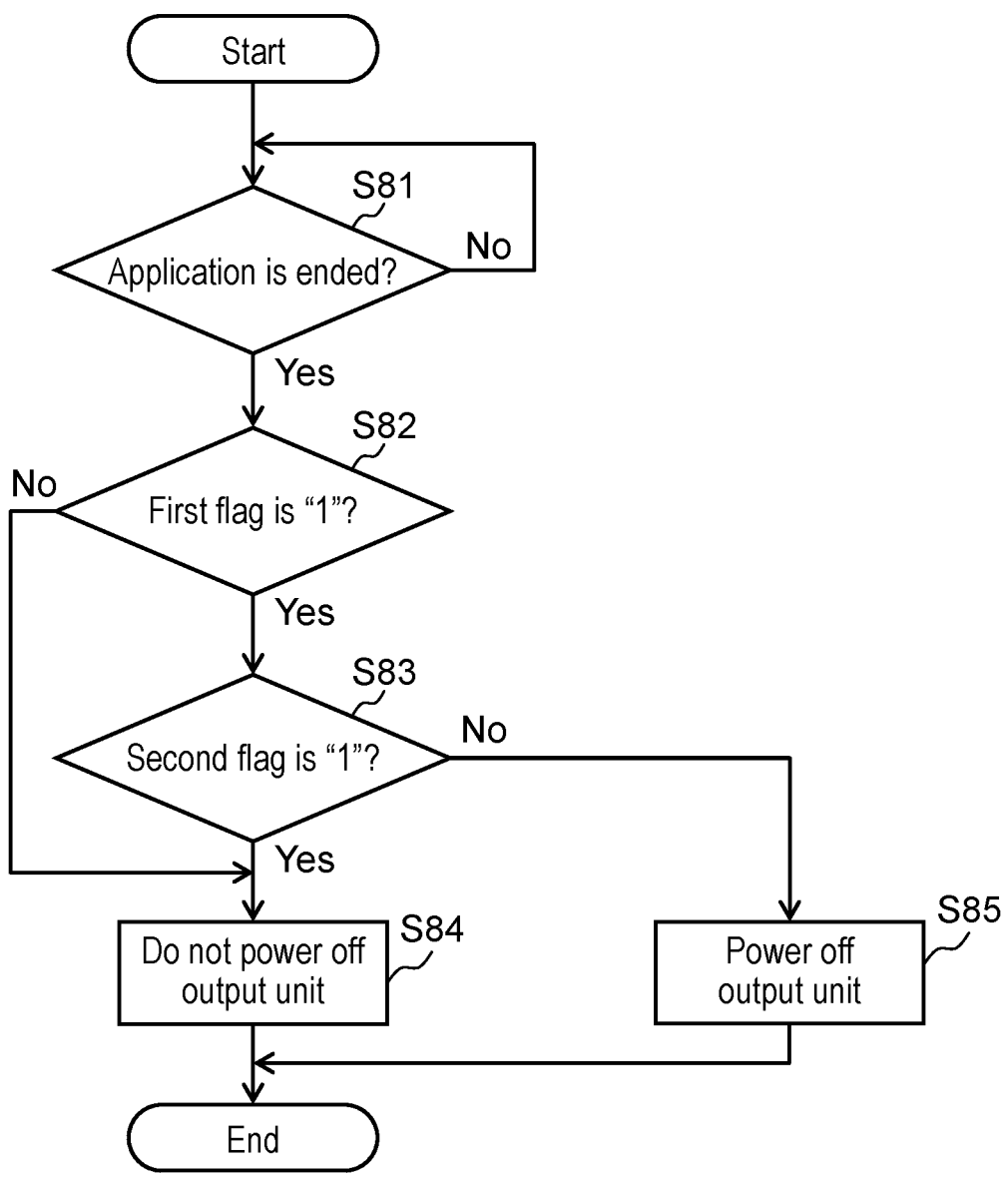
FIG. 17 is a flowchart illustrating an example of control performed on power of an output unit with the output device according to the third exemplary embodiment after the application is ended.

FIG. 17 is a flowchart illustrating an example of the control performed on output unit 410 with output device 400 according to the third exemplary embodiment after the application is ended.

First, controller 430 determines whether output unit 410 has ended the execution of the application corresponding to the start-up request (step S81).

The processing in step S81 may be paraphrased as "controller 430 manages whether the application corresponding to the application start-up request transmitted from information terminal 200 is currently executed (an execution state of the application)".

Next, when it is determined in step S81 that output unit 410 has ended the execution of the application (Yes in step S81), controller 430 determines whether the value of the first flag is "1" (step S82).

On the other hand, when it is determined in step S81 that output unit 410 has not ended the execution of the application (No in step S81), controller 430 repeats the determination in step S81. That is, controller 430 waits until output unit 410 ends the execution of the application.

When it is determined in step S82 that the value of the first flag is "1" (Yes in step S82), controller 430 determines whether the value of the second flag is "1" (step S83).

That is, output unit 410 is powered on from the power-off state in response to the application start-up request transmitted from information terminal 200, and then output unit 410 ends the execution of the application. At this point, controller 430 determines whether recepter 150 has received the user operation on output device 400 until the execution of the application is ended after output unit 410 is powered on.

When it is determined in step S82 that the value of the first flag is "0" (No in step S82), or when it is determined in step S83 that the value of the second flag is "1" (Yes in step S83), controller 430 does not power off output unit 410 (step S84). That is, controller 430 maintains output unit 410 in the power-on state.

When it is determined in step S83 that the value of the second flag is "0" (No in step S83), controller 430 performs the second control to power off output unit 410 (step S85).

As described above, when the value of the first flag is "1", and when the value of the second flag is "0", controller 430 powers off output unit 410 after the application is ended. That is, when output unit 410 is powered on from the power-off state in response to the application start-up request transmitted from information terminal 200, and when recepter 150 has not received the user operation on output device 400 during the execution of the application, controller 430 powers off output unit 410 from the power-on state after the application is ended.

On the other hand, when the value of the first flag is "0", or when the value of the second flag is "1", controller 430 maintains output unit 410 in the power-on state even after the application is ended. That is, when output unit 410 is not powered on in response to the application start-up request transmitted from information terminal 200 (that is, output unit 410 is powered on before communicator 120 receives the application start-up request from information terminal 200), or when recepter 150 receives the user operation on output device 400 before the application is ended, controller 430 maintains output unit 410 in the power-on state even after the application is ended.

[3-3. Effect and the Like]

As described above, in the present exemplary embodiment, the output device includes the output unit that outputs at least one of the video and the sound, the communicator that establishes the direct wireless connection to the information terminal, and the controller. When the communicator receives the application start-up request from the information terminal through wireless connection, and when the output unit is powered off, the controller performs the first control to power on the output unit, and issues the instruction to output at least one of the video and sound, which are generated by the application started up in response to the start-up request, to the output unit. When the application started up in response to the start-up request is ended after the first control is performed, the controller performs the second control to power off the output unit.

Output device 400 is an example of the output device. Output unit 410 is an example of the output unit. Communicator 120 is an example of the communicator. Controller 430 is an example of the controller. Information terminal 200 is an example of the information terminal. Wi-Fi Direct (registered trademark) is an example of the direct wireless connection between the output device and the information terminal.

For example, in the configuration example of output device 400 of the third exemplary embodiment, output device 400 includes output unit 410, communicator 120, and controller 430. Output unit 410 outputs at least one of the video and the sound. Communicator 120 establishes the direct wireless connection to information terminal 200. When communicator 120 receives the application start-up request from information terminal 200 through wireless connection, and when output unit 410 is powered off, controller 430 performs the first control to power on output unit 410, and issues the instruction to output at least one of the video and sound, which are generated by the started-up application, to the output unit 410. When the application is ended after the first control is performed, controller 430 performs the second control to power off output unit 410.

Therefore, in output device 400, even if the user operation on output device 400 is not performed and output unit 410 is powered off, output unit 410 is powered on by the reception of the start-up request from information terminal 200, and output unit 410 executes the application corresponding to the start-up request. That is, when the user operation is performed by information terminal 200 in order to transmit the application start-up request from information terminal 200 to output device 400, even if the user operation is not performed by information terminal 200 for the purpose of the wireless connection to output device 400, the wireless connection between information terminal 200 and output device 400 is established to automatically power on output unit 410, and output device 400 executes the application corresponding to the application start-up request by wireless communication from information terminal 200. Accordingly, in the present exemplary embodiment, the user operation can be simplified when output device 400 is operated on information terminal 200.

In the operation example of output device 400 of the third exemplary embodiment, when the application started up in response to the application start-up request is ended after the first control is performed, controller 430 performs the second control to power off the output unit 410.

Therefore, in output device 400, because controller 430 performs the second control to automatically power off output unit 410, even if the user does not perform the operation to power off output unit 410, output unit 410 can automatically be returned to the original power-off state after the application is ended.

The controller may not perform the second control when the user operation on the output device is received until the application started up in response to the start-up request is ended after the first control is performed.

For example, in the operation example of output device 400 described in the third exemplary embodiment, controller 430 does not perform the second control when the user operation on output device 400 is received until the application started in response to the application start-up request is ended after the first control is performed. That is, when the user operation on output device 400 is received until the end of the application started up in response to the application start-up request, controller 430 does not perform the control to automatically power off output unit 410 after the application is ended, but maintains output unit 410 in the power-on state. Therefore, even if the user who performs the user operation on output device 400 does not perform the operation to maintain output device 400 in the power-on state, the user can continuously use output device 400 after the application is ended.

[3-4. First Modification]

Next, a first modification of the third exemplary embodiment will be described below with reference to FIG. 18.

The controller of the output device may power off the output unit in the case where the application started up in response to the application start-up request is ended by the user operation received from the information terminal.

For example, in the configuration example of the third exemplary embodiment, controller 430 of output device 400 may power off output unit 410 when the application started up in response to the start-up request is ended by the user operation received from information terminal 200.

Specifically, controller 430 may power off output unit 410 when recepter 150 receives an application end request from information terminal 200 while output unit 410 outputs the video and/or sound generated by the execution of the application after output unit 410 is powered on to start up the application in response to the application start-up request from information terminal 200. The processing in this case will be described with reference to FIG. 18. Because output device 400 according to the first modification of the third exemplary embodiment is substantially identical to output device 400 of the third exemplary embodiment, the detailed description will be omitted.

Figure 18:
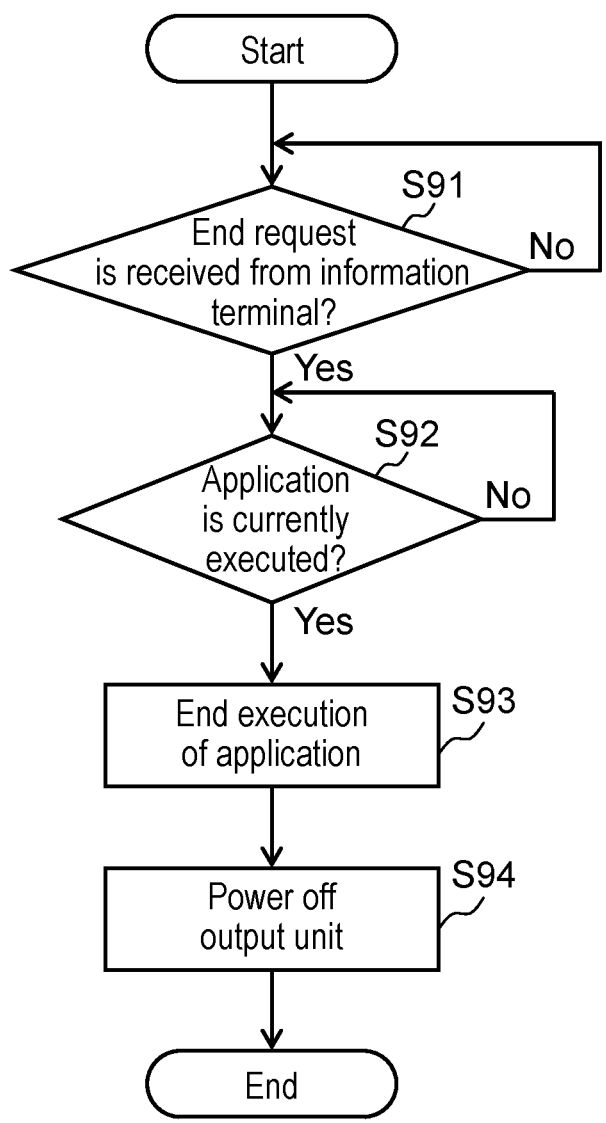
FIG. 18 is a flowchart illustrating an example of operation, which is performed by an output device according to a first modification of the third exemplary embodiment when an end request is received from the information terminal.

FIG. 18 is a flowchart illustrating an example of operation, which is performed by output device 400 according to the first modification of the third exemplary embodiment when the end request is received from information terminal 200.

First, controller 430 determines whether recepter 150 has received the end request from information terminal 200 (step S91).

When it is determined in step S91 that recepter 150 has received the end request from information terminal 200 (Yes in step S91), controller 430 determines whether the application corresponding to the start-up request is currently executed (step S92).

On the other hand, when it is determined in step S91 that recepter 150 has not received the end request from information terminal 200 (No in step S91), controller 430 repeats the determination in step S91.

When it is determined in step S92 that the application is not currently executed (No in step S92), controller 430 repeats the determination in step S92.

When it is determined in step S92 that the application is currently executed (Yes in step S92), controller 430 ends the execution of the application (step S93), and powers off output unit 410 (step S94).

As described above, in output device 400 according to the first modification of the third exemplary embodiment, the user who operates output device 400 from information terminal 200 can power off output unit 410 by making the application end request using information terminal 200, without performing the user operation to power off output unit 410. Accordingly, the user operation can be simplified.

Other Exemplary Embodiments

The exemplary embodiments are described above as the illustration of the technique in the present disclosure. The accompanying drawings and the detailed description are provided to this end. However, the technique in the present disclosure is not limited to the above exemplary embodiments, but the technique in the present disclosure can also be applied to exemplary embodiments in which various changes, replacements, additions, and omissions are made. A new exemplary embodiment can also be made by a combination of constituents of the first to third exemplary embodiments.

The constituent illustrated or described in the accompanying drawings and detailed description includes not only the constituent essential for solving the problem but also the constituent that is not essential for solving the problem, in order to illustrate the technique. It is noted that the nonessential constituent is not immediately recognized as the essential constituent even if the nonessential constituent is illustrated or described in the accompanying drawings or detailed description.

The above exemplary embodiments illustrate the technique in the present disclosure by way of example, and various changes, replacements, additions, and omissions can be made without departing from the scope of the claims and equivalents thereto.

INDUSTRIAL APPLICABILITY

The present disclosure can be applied to the reproducing device and the output device. Specifically, the present disclosure can be applied to a TV, a recorder, a set-top box, and the like.

REFERENCE MARKS IN THE DRAWINGS 100, 100a reproducing device
110, 110a reproducer
111 video reproducer
112 audio reproducer
115 authentication screen
120 communicator
130, 130a controller
140 storage
141 permission list
150 recepter
160 accepter
200, 200a, 200b information terminal
210 accepter
220 display unit
230 controller
240 communicator
300 remote controller
400 output device
410 output unit
430 controller

The invention claimed is:

1. A reproducing device comprising:
a reproducer that reproduces a content;
a communicator that establishes a direct wireless connection to an information terminal;
a receiver that receives an input based on a user operation; and
a controller that determines whether the information terminal is an information terminal that was previously permitted a communication connection or not, based on a permission list stored in the reproducing device and terminal information indicating the information terminal and obtained from the information terminal, when the communicator receives a content reproduction request from the information terminal through the direct wireless connection,
the controller performing first control to power on the reproducer and issuing an instruction to perform the content reproduction to the reproducer when the information terminal is determined to be the previously permitted information terminal and when the reproducer is powered off,
when the information terminal is determined not to be the previously permitted information terminal, the controller determining whether the reproducer is powered on or not,
when the controller determines that the reproducer is powered off, the controller not performing the first control,
when the controller determines that the reproducer is being powered on, the controller causing the reproducer to output authentication information to ask a user whether or not the content reproduction request from the information terminal that was determined not to be the previously permitted information terminal is to be received in the reproducing device,
when the receiver has received a user input indicating that the content reproduction request is to be received, the controller registering the terminal information obtained from the information terminal that was determined not to be the previously permitted information terminal in the permission list, and
when the receiver has received a user input indicating that the content reproduction request is not to be received, the controller not registering the terminal information obtained from the information terminal that was determined not to be the previously permitted information terminal in the permission list.

2. The reproducing device according to claim 1, wherein the controller performs second control to power off the reproducer when the content reproduction started in response to the content reproduction request is ended after the first control is performed.

3. The reproducing device according to claim 1, wherein the controller performs second control to power off the reproducer when the content reproduction started in response to the content reproduction request is ended after the first control is performed, and
the controller does not perform the second control when user operation on the reproducing device is received until the content reproduction started in response to the content reproduction request is ended after the first control is performed.

4. The reproducing device according to claim 1, wherein the controller powers off the reproducer when the content reproduction started in response to the content reproduction request is ended by user operation received from the information terminal.

5. The reproducing device according to claim 1, wherein:
the reproducer includes a video reproducer that reproduces video and an audio reproducer that reproduces sound,
the controller determines a type of the content that is a target of the content reproduction request, and
the controller individually controls power of the video reproducer and power of the audio reproducer according to a result of the determination of the type when the reproducer including the video reproducer and the audio reproducer is powered off.

6. The reproducing device according to claim 1, wherein:
the reproducer includes a video reproducer that reproduces video and an audio reproducer that reproduces sound,
the controller determines a type of the content that is a target of the content reproduction request,
the controller individually controls power of the video reproducer and power of the audio reproducer according to a result of the determination of the type when the reproducer including the video reproducer and the audio reproducer is powered off,
the controller performs a control to power on not the audio reproducer but the video reproducer and performs a control to issue the instruction to perform the content reproduction to the video reproducer when the type of the content is determined to be the video and when the reproducer including the video reproducer and the audio reproducer is powered off, and
the controller performs a control to power on not the video reproducer but the audio reproducer and performs a control to issue the instruction to perform the content reproduction to the audio reproducer when the type of the content is determined to be the sound and when the reproducer including the video reproducer and the audio reproducer is powered off.

7. An output device comprising:
an output unit that outputs at least one of video and sound;
a communicator that establishes a direct wireless connection to an information terminal;
a receiver that receives an input based on a user operation; and
a controller that determines whether the information terminal is an information terminal that was previously permitted a communication connection or not based on a permission list stored in the output device and terminal information indicating the information terminal obtained from the information terminal, when the communicator receives an application start-up request from the information terminal through the direct wireless connection,
the controller performing first control to power on the output unit and issuing an instruction to output at least one of the video and the sound, which are generated by an application started up in response to an application start-up request, to the output unit, when the information terminal is determined to be the previously permitted information terminal and when the output unit is powered off,
when the information terminal is determined not to be the previously permitted information terminal, the controller determining whether the output unit is powered on or not,
when the controller determines that the output unit is powered off, the controller not performing the first control,
when the controller determines that the output unit is being powered on, the controller causing the output unit to output authentication information to ask a user whether or not the application start-up request from the information terminal that was determined not to be the previously permitted information terminal is to be received in the output device,
when the receiver has received a user input indicating that the application start-up request is to be received, the controller registering the terminal information obtained from the information terminal that was determined not to be the previously permitted information terminal in the permission list, and
when the receiver has received a user input indicating that the application start-up request is not to be received, the controller not registering the terminal information obtained from the information terminal that was determined not to be the previously permitted information terminal in the permission list,
wherein the controller performs second control to power off the output unit when the application started up in response to the application start-up request is ended after the first control is performed.

8. The output device according to claim 7, wherein the controller does not perform the second control when user operation on the output device is received until the application started up in response to the application start-up request is ended after the first control is performed.

9. The output device according to claim 7, wherein the controller performs a control to power off the output unit when the application started up in response to the application start-up request is ended by user operation received from the information terminal.

* * * * *